(12) United States Patent
Zhou et al.

(10) Patent No.: US 12,730,191 B2
(45) Date of Patent: Sep. 8, 2026

(54) FALSE SIGNAL REDUCING LIDAR WINDOW

(71) Applicant: Motional AD LLC, Boston, MA (US)

(72) Inventors: Yong Zhou, New Kensington (PA); Geng Fu, Belmont (MA)

(73) Assignee: Motional AD LLC, Boston, MA (US)

( * ) Notice: Subject to any disclaimer, the term of this patent is extended or adjusted under 35 U.S.C. 154(b) by 922 days.

(21) Appl. No.: 17/931,057

(22) Filed: Sep. 9, 2022

(65) Prior Publication Data

US 2025/0216513 A1 Jul. 3, 2025

Related U.S. Application Data

(60) Provisional application No. 63/321,438, filed on Mar. 18, 2022.

(51) Int. Cl.
*G01S 7/481* (2006.01)
*G01S 17/931* (2020.01)

(52) U.S. Cl.
CPC .......... *G01S 7/4813* (2013.01); *G01S 17/931* (2020.01)

(58) Field of Classification Search
CPC ...... G01S 7/4813; G01S 17/931; G02B 5/003
See application file for complete search history.

(56) References Cited

U.S. PATENT DOCUMENTS

2005/0168720 A1* 8/2005 Yamashita ............ G01S 7/4817 356/5.01
2007/0210979 A1* 9/2007 Shingyoji ............ H01Q 17/001 343/711
2018/0164408 A1* 6/2018 Hall ...................... G01S 7/4811
2018/0335507 A1* 11/2018 Shim ..................... G01S 7/4812
2019/0113662 A1* 4/2019 Horesh ................. A61B 5/1114
2020/0132851 A1 4/2020 Gassend et al.
2021/0025984 A1* 1/2021 Schultz ..................... C03C 4/10
2021/0101369 A1* 4/2021 Lambricht ........ B32B 17/10119
2022/0086417 A1 3/2022 Wang
2022/0358328 A1 11/2022 Wu et al.

(Continued)

FOREIGN PATENT DOCUMENTS

EP 1562055 A2 8/2005
EP 2381268 B1 6/2012

OTHER PUBLICATIONS

International Search Report and Written Opinion received for PCT Patent Application No. PCT/US2023/064342, mailed on Jun. 14, 2023.

(Continued)

*Primary Examiner* — Yuqing Xiao
*Assistant Examiner* — Jempson Noel
(74) *Attorney, Agent, or Firm* — KNOBBE, MARTENS, OLSON & BEAR, LLP

(57) ABSTRACT

Various methods and systems are disclosed to reduce the false alarm in a lidars having a lidar window surrounding the lidar system, by increasing the propagation loss for a portion of incident light that propagates within the thickness of the lidar window and may be guided toward the detection system of the lidar via an indirect path. Alternatively, or in addition, the shape of the lidar window may be tailored to direct the portion of incident light that propagates within the thickness of the lidar window away from the lidar detection system.

20 Claims, 11 Drawing Sheets

(56) References Cited

U.S. PATENT DOCUMENTS

2023/0027369 A1 1/2023 Schmitt et al.

OTHER PUBLICATIONS

SAE On-Road Automated Vehicle Standards Committee, “SAE International’s Standard J3016: Taxonomy and Definitions for Terms Related to Driving Automation Systems for On-Road Motor Vehicles”, Jun. 2018, in 35 pages.

“Beer-Lambert law”, Wikipedia, accessed Jan. 21, 2026, in 11 pages. URL: https://en.wikipedia.org/wiki/Beer% E2%80%93Lambert_law.

International Preliminary Report received for PCT Application No. PCT/US2023/064342, mailed on Oct. 3, 2024.

* cited by examiner

FALSE SIGNAL REDUCING LIDAR WINDOW

INCORPORATION BY REFERENCE TO ANY PRIORITY APPLICATIONS

This application claims the priority benefit of U.S. Patent Prov. App. 63/321,438, entitled FALSE SIGNAL REDUCING LIDAR WINDOW, filed on Mar. 18, 2022 and is incorporated herein by reference in its entirety.

DETAILED DESCRIPTION

Lidar System Overview

Figure 1:
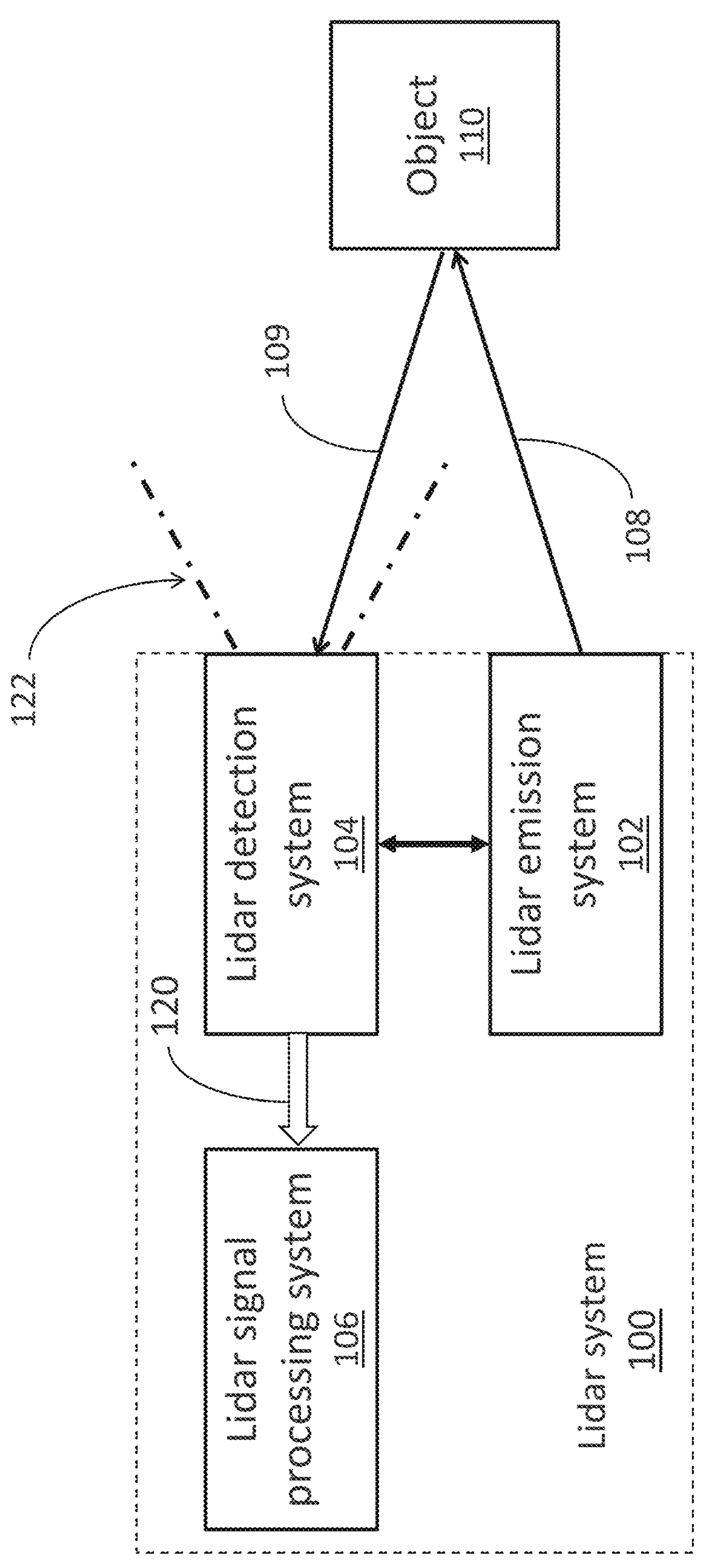
FIG. 1 is a diagram illustrating a lidar system that detects objects in an environment by emitting optical probe beams and receiving the respective reflected optical beams.

Self-driving vehicles preferably include highly accurate and reliable sensors to detect objects and calculate their distances from the vehicle. Among various technologies developed for object detection and ranging, laser-based range finders are often used for autonomous driving systems due to their high resolution and accuracy. Beyond autonomous driving systems, laser-based range finders may be used in other applications where detection of objects in an environment and determining the position and/or the velocity of the objects with respect to a reference frame is desired. Laser based range finders or laser range finders are sometimes called Light Detection and Ranging (lidar) or Laser Detection and Ranging (ladar). The acronyms "lidar" and "ladar" may be used interchangeably to refer to an optical system that detects objects using laser light.

Lidar systems use light beams (e.g., laser beams) to detect objects in the environment surrounding the lidar and determine their distances from the lidar. In some cases, a lidar may also determine the velocity of an object with respect the lidar. High resolution (e.g., high spatial resolution for detecting objects) and the accuracy of lidar systems have made them preferred sensors for many applications. In particular, lidar systems are used in various autonomous driving systems for continuous scanning of the surrounding environment of a vehicle to avoid collision between the vehicle and objects in the environment. A lidar system detects objects by sending optical probe beams to the environment and receiving the respective reflected optical beams off of the objects in the environment. A detection system of the lidar may receive a reflected optical beam and generate a return signal (e.g., an electronic signal) indicative of a detection of a portion of an optical probe beam reflected by an object in the environment. Subsequently, the lidar may use the return signal to determine the distance between the object and the lidar and/or the velocity of the object with respect to the lidar.

In some cases, a lidar system may include a lidar window through which optical probe beams are emitted to the environment and the corresponding reflected optical beams are received from the environment. In some such cases, a portion of a light beam incident on the lidar window (e.g., a reflected or scattered optical beam associated with an optical probe beam emitted by the lidar) can be transformed to into a guided optical beam that propagates within the thickness of the lidar window by a defect or particle on or within the thickness of the lidar window. In some cases, a portion of the guided optical beam may be scattered toward the lidar detection system causing the generation of a false return signal indicating existence of artificial objects at artificial distances.

This application addresses excess noise, false positive alarms, inaccurate ranges, and other problems associated with light coupled to and guided within the thickness of the lidar window by increasing propagation loss for the guided light or directing the guided light away from the detection system of the lidar. In one embodiment, the optical absorption of the lidar window may be selected such that as the guided light propagates within the thickness of the lidar window its intensity is reduced to a level below a detectability threshold of the detection system of the lidar before being received by the detection system of the lidar. For example, the optical absorption of the material from which the lidar window is formed may be increased by adding light absorbing dopants to the material. In another embodiment, the shape of the lidar window may be tailored such that guided light is directed away from the detection system of the lidar as it propagates within the thickness of the lidar window.

The designs, systems, and methods described below could be incorporated into various type of autonomous vehicles and self-driving cars for examples those disclosed in U.S. patent application publication Ser. No. 17/444,956, entitled "END-TO-END SYSTEM TRAINING USING FUSED IMAGES" and filed Aug. 12, 2021, and Ser. No. 17/443,433, entitled "VEHICLE LOCATION USING COMBINED INPUTS OF REDUNDANT LOCALIZATION PIPELINES" and filed Jul. 26, 2021, the entire contents of which are incorporated by reference herein and made a part of this specification In some cases, an optical probe beam emitted by a lidar system may comprise an optical probe signal. In some such cases, the lidar may detect an object and determine a distance between the object and the lidar by illuminating the object with the optical probe beam and receiving a reflected optical beam associated with a reflection of the optical probe beam by the object. In some cases, the reflected optical beam may comprise a reflected optical signal associated with the optical probe signal. The lidar may determine a distance between the object and the lidar by measuring a delay between the emission of the optical probe signal and reception of the corresponding reflected optical signal. In some cases, the emitted optical probe beam and the reflected optical beam may propagate in substantially parallel directions. In some cases, a portion of the optical probe beam may be reflected or scattered by an object along directions that are not substantially parallel to the optical probe beam. In examples, an angle between an emitted optical probe beam and the corresponding reflected optical beam may be less than 2 degrees, less than 5 degrees, or less than 10 degrees. In some cases, the angle between an emitted optical probe beam and the corresponding reflected optical beam can be from 4 to 5 degrees, or from 5 to 6 degrees. In some cases, a portion of the reflected optical beam may propagate from the object directly to the lidar detection system along a nearly straight or reflection-free optical path extended from the object to the lidar (without being reflected by any other surface). In some cases, the nearly straight or reflection-free optical path may comprise refraction of light while passing through the thickness of the lidar window. The lidar may detect the reflected optical signal associated with the directly received portion of reflected optical beam to determine the distance between the object and the lidar. In some such cases, at least a portion of the reflected optical beam may not propagate toward the lidar detection system along a nearly straight optical path. For example, a portion of the reflected optical beam may be further reflected or scattered by one or more surfaces (e.g., surfaces of a lidar window) before being received by the lidar detection system. In some cases, the portion that is not directly received by the lidar detection system via a straight or nearly straight optical path extended from an object to the detection system of the lidar, may cause the generation of false return signals by the detection system.

In some embodiments, the optical probe beams may have a wavelength within an operating wavelength range of the lidar. In some examples, the lidar window may have high optical transparency for wavelengths within the operating wavelength range of the lidar and the lidar detection system may have higher level of detectivity (or responsivity) for wavelength within the operating wavelength range of the lidar system.

In some cases, the incident optical probe signal may comprise a temporal variation of an optical property (e.g., amplitude, phases, frequency, polarization) of a laser beam emitted by the lidar. For example, the optical probe signal can be a laser pulse (e.g., a variation of laser intensity) and the lidar may determine the distance from the object by measuring a delay or time-of-flight (ToF) between the transmission of incident laser pulse, and reception of the corresponding reflected laser pulse. In some cases, lidars that determine the distance from the objects based on the time-of-flight of a laser pulse may be referred to as ToF lidars. A time-of-flight (TOF) Lidar may generate return signals usable to determine a position of an object and the reflectivity of the object surface.

In some applications (e.g., to control and guide an autonomous vehicle in a complex driving environment), a lidar can continuously scan an environment (e.g., environment surrounding the vehicle) with a relatively high scanning speed to capture the changes in the position of the objects in the environment. For example, the lidar may scan the surrounding environment by rotating one or more optical probe beams (e.g., laser beams) around a rotational axis while scanning the direction of propagation of the laser beams in a plane parallel to the rotational axis.

In some implementations, a lidar may include a protective lidar window (also referred to as a "ring lens") that protects the lidar system while allowing transmission of light from the environment to the lidar and from the lidar to the environment. In some examples, the lidar window may have an inner surface, and an outer surface separated from the inner surface by a thickness of the lidar window. In some such examples, the optical probe beams emitted by the lidar may become incident on the inner surface of the lidar window and reflections of the optical probe beams received from the environment may become incident on the outer surface of the lidar window. In some cases, a portion of the optical probe beams and the reflections of the optical probe beams may pass through the thickness of the lidar window without being reflected or scattered by the inner or outer surface of the lidar window.

In some cases, defects and contaminations of the lidar window may scatter light (e.g., received from the environment or emitted by the lidar), such that a portion of light is guided and propagates within the thickness of the lidar window between the inner and outer surfaces of the lidar window, e.g., by total internal reflection (TIR). After traveling certain distance within the thickness of the lidar window, a portion of this guided light can be scattered by the same or other defects or contaminations toward the detection system of the lidar. In some cases, e.g., when the guided light is associated with the reflection by a near field object, the portion of guided light that is scattered toward the lidar system can be strong enough to be detected by the lidar and be falsely identified as reflected light directly received from an object. As such, particularly in the presence of defects and contaminations on a surface or within the thickness of the lidar window, a lidar may generate false return signals indicative of presence of non-existing objects (also referred to as artificial objects) and erroneous distances associated with light coupled into and out of the thickness of the lidar window by defects and contaminations on or within the lidar window (collectively referred to as artifacts), and guided toward the detection system of the lidar by multiple reflections off of the surfaces of the lidar window. Given that guided light associated with optical beams reflected by near field objects can have a higher intensity (or power) compared to guided light associated with optical beams reflected by far field objects, the scattered portion of guided light associated with light beams received from near filed objects may generate false return signals associated with indirectly received guided light, with higher probability. As such, the false return signals are sometimes referred to as near field false positive noise.

To eliminate propagation of light coupled into the thickness of the lidar window toward the detection system of the lidar, in some previous designs, the lidar window was divided into separate optically isolated sections. However, such designs may be only applicable to bi-static lidar architectures. Moreover, these designs may not allow detection of near field objects due to parallax.

As such, there is a need for new methods that can improve the reliability of lidar systems in the presence of contaminations on a surface of the lidar window or defects within the thickness of the lidar window.

Various designs described below may reduce the probability of generation of false signals by the light guided and scattered within the lidar window by increasing the attenuation of the light guided within the thickness of the lidar window such that the optical intensity (or power) of the scattered portion of guided light is reduced below a detection threshold of the lidar detection system.

In some cases, the attenuation of guided light propagating within the thickness of the lidar window may be carefully tailored, to reduce near field false positive noise without significantly affecting the attenuation of light beams that are transmitted through the thickness of the lidar window (without being scattered, guided, and/or reflected by the lidar window). In some such cases, the attenuation of guided light propagating within the thickness of the lidar window may be tailored by adjusting the optical absorption coefficient of the material from which the lidar window is formed (herein referred to as the window material), for light having a wavelength within the operating wavelength range of the lidar window. For example, the optical absorption of the window material may be selected to be larger than a lower optical absorption limit and smaller than a higher optical absorption limit. In some cases, the attenuation of guided light propagating within the thickness of the lidar window may be increased by forming the lidar window from a material having an optical absorption coefficient between the lower and higher optical absorption limits for light having a wavelength within the operating wavelength range of the lidar window. As such, some of the designs and solutions described below, may include providing a window material having an optical absorption coefficient between the lower and higher optical absorption limits for light having a wavelength within the operating wavelength range of the lidar window. In some cases, providing such material may comprise modifying or selecting the window material or controlling the concentration of certain light absorbing impurities (e.g., dyes) in the window material. In some implementations, the optical absorption coefficient of the window material may be selected or modified based at least in part on a geometry (e.g., a diameter, an average diameter, or a thickness) of the lidar window. In some implementations, the optical absorption coefficient of the window material may be selected or modified based at least in part on a field of view lidar detection system, a detection threshold lidar detection system, and/or a position of the lidar detection system (e.g., with respect to the lidar window).

Advantageously, these designs can be implemented without modifying the original design of the lidar window or the lidar system and are compatible with co-axial lidar architecture to enable near filed detection while mitigating the near filed false positive noise.

Some other methods and designs described below may include lidar window geometries that reduce the probability of the scattered portion of guided light to be received and/or detected by the detection system of the lidar. In some cases, one or more geometrical parameters of the lidar window may be tailored such that the light guided within the thickness of the lidar window propagates away from the lidar and cannot reach the detection system of the lidar, or a sensor in the detection system of the lidar.

Lidar System Operation

FIG. 1 shows an example of a lidar system 100 (or lidar 100) that detects objects in an environment surrounding the lidar 100 and determines distances between the objects and the lidar 100. In some cases, the lidar system 100 may additionally determine a velocity of an object, e.g., relative to the lidar 100. The lidar 100 includes a lidar emission system 102 that emits optical probe beams, and a lidar detection system 104 that receives the reflected optical beams (e.g., reflections of optical probe beams by the objects in the environment) and generates return signals based at least in part on the reflected optical beams.

The lidar system 100 may detect an object 110 by emitting an optical probe beam 108 (e.g., a laser beam) and receiving a reflected optical beam 109 corresponding to a reflection of the optical probe beam 108. As described above, in some cases, the reflected optical beam 109 may propagate from the object 110 to the lidar 100 along a straight optical path. In some cases, the optical probe beam 108 may comprise one or more optical probe signals and the reflected optical beam 109 may comprise one or more reflected optical signals. An optical probe signal may be a temporal variation of an optical property (e.g., amplitude, phase, or frequency) of the corresponding optical probe beam. In some implementations, the lidar system 100 may include an emission system 102, a detection system 104, and a lidar signal processing system 106. In some cases, the emission system 102 may emit the optical probe beam 108 toward the object 110, and the detection system 104 may receive the reflected optical beam 109. In some examples, the optical probe beam 108 may comprise an optical signal (e.g., an optical pulse) emitted by the emission system 104 at an emission time (t1) and the reflected optical beam 109 may comprise a reflected optical signal received by the optical detection system 104. In some such examples, the detection system 104 may determine an amplitude and an arrival time (t2) of the reflected optical signal. In some cases, the detection system may determine a delay (t2−t1) between an emission time (t1) and the arrival time (t2). In some implementations, the detection system may convert the reflected optical signal to an electric signal (e.g., a photocurrent or a photovoltage) and generate a return signal 120. In some cases, the return signal 120 may comprise the electric signal or an amplified version of the converted electric signal. In some cases, the return signal 120 may indicate the arrival time (t2), the magnitude (e.g., power or intensity) of the reflected optical signal, and/or the delay between the emission time (t1) and the arrival time (t2). In some cases, the return signal 120 may include a plurality of return signals associated with different sensing elements (e.g., pixels) of the lidar detection system 102.

The lidar system 100 may further comprise a lidar signal processing system 106 that receives the return signal and determines the presence of the object 110 in the environment and calculates a distance between the lidar system 100 and the object 110 based at least in part on the return signal 120. In some examples, where the return signal 120 indicates the arrival time (t2), the lidar signal processing system 106 may determine the delay between the emission time (t1) and arrival time (t2) and use the delay to calculate the distance between the lidar system 100 and the object 110.

In various implementations, the optical probe beam (108) may have a wavelength in the infrared (IR) wavelength range. In some examples, the optical probe beam (108) may have a wavelength in the near-IR wavelength range (e.g., from 800 nm to 1800 nm). In some cases, the operating wavelength range of the lidar system 100 can be in the mid-IR wavelength range (e.g., from 1800 nm to 5000 nm or larger).

In some embodiments, the lidar detection system 104 (also referred to as "detection system") may comprise an optical system, a lidar sensor (e.g., a photodetector that converts light to electric signals), and a readout system. The optical system may direct light received through a field of view (FOV) 122 of the detection system 104 toward the sensor. In some cases, the FOV 122 may include a range of propagation directions along which light propagating toward the lidar detection system 102 is directed to a lidar sensor included in the lidar detection system 104. The lidar sensor may generate a plurality of photocurrents based on the light received from the optical system (e.g., by converting the received light to a photocurrent proportional to the intensity of the received light). The readout system may receive the plurality of photocurrents from the lidar sensor (also referred to as "sensor") and use them generate a return signals. The return signals can be usable for determining the presence of an object in the environment and estimating a distance between the lidar and the object.

The lidar sensor may comprise a plurality of pixels each configured to generate a photocurrent upon being illuminated by light received from the optical system. The optical system may be reconfigured to direct all or a portion of the light received via its FOV on all or a portion of pixels of the sensor. In some implementations, the sensor may generate a plurality of photocurrents where each photocurrent of the plurality of photocurrents is generated by one or more pixels of the sensor. In some cases, a pixel may include plurality of microcells (sub-pixels).

In some cases, lidar detection system may include a readout circuit configured to receive and process the one or more photocurrents from the sensor. In some cases, the readout circuit may generate one or more return signals using the one or more photocurrents. In some cases, a return signal may be generated by a photocurrent received form a single pixel of the sensor. In some such cases, the return signal may be proportional to the received photocurrent. The readout circuit may use a photocurrent received from a pixel and generate a return signal indicative of the optical power of and the arrival time of an optical signal (e.g., a reflected optical signal) received by the pixel via the optical system. In some other cases, the readout circuit may use a plurality of photocurrents received from a group of pixels and generate one or more return signals indicative of the optical power of and the arrival time of an optical signal (e.g., a reflected optical signal) received by the group of pixels via the optical system. In some cases, the readout circuit may determine the rise time, peak time, peak value, area, and the temporal shape of the optical signal based on the one or more photocurrents. In some examples, power and timing calculations can be based on edge, peak, and shape of the optical signal.

In some cases, the signal processing system of a lidar (e.g., a TOF lidar) may use the arrival time of the photons received by one or more pixels or microcells to calculate a distance between an object by which the photons were reflected and the lidar. In some cases, the signal processing system of a lidar (e.g., a TOF lidar) may use the arrival time of the photons received by one or more pixels or microcells to calculate a distance between an object by which the photons were reflected and the lidar. In some cases, the signal processing system may additionally use a temporal behavior (e.g., shape) of photocurrents received from the sensor 320 to determine the distance.

In some cases, a scanning lidar system (e.g., a ToF scanning lidar system) may scan one or more narrow optical probe beams over a field of view (e.g., a wide field of view) of the detection system of the lidar system and detect the corresponding reflected optical beams received through the field of view. In some cases, the one or more light beams may be generated by an optical scanning system (e.g., a rotating mirror) that receives a light beam from a laser source and re-directs the light beam along different directions at different times. In some examples, the optical scanning system may rotate the optical probe beams between different angular positions with respect to the emission system.

In some cases, a flash lidar system may use a single optical probe beam (e.g., a highly divergent beam) generated by an emission system to illuminate a field of view (e.g., a large field of view). The detection system of the flash lidar system may receive reflected portions of the optical probe via different sections of the field of view using a two dimensional (2D) array of detectors (e.g., pixels). The pixels and an optical system (e.g., one or more lenses) may be configured such that each pixel detects light received from a specific portion of the field of view (e.g., received from a specific direction).

In some cases, a mechanical lidar system may use a single optical probe beam (e.g., a low divergence optical beam) generated by an emission system of the mechanical lidar system to illuminate a narrow field of view (e.g., a large field of view). The mechanical lidar system may rotate the optical probe beam to scan the environment. The mechanical lidar system may comprise a detection system that measures a reflection of the optical probe beam received via a field of view of the detection system 236. The mechanical lidar system may rotate the detection system and the corresponding field of view together with the emission system such that the optical probe beam and its reflections are transmitted and received within a narrow angular width aimed toward an object.

In various implementations, any of the lidar system described above can be a ToF lidar system and they may include a lidar window surrounding the lidar system. Various methods and systems described below may be implemented in any of the lidar systems described above to reduce or eliminate generation of erroneous or false return signals associated with light received by the lidar detections system via an indirect optical path where at least a portion of the optical path comprises a guided optical path within the thickness of the lidar window.

As described above, a lidar may comprise a lidar window through which the optical probe beams are emitted to the environment and the corresponding reflected optical beams are received. In some cases, the lidar window can be a protective window that isolates the lidar from the surrounding environment and protects it from possible contaminations (e.g., dust, moisture, and the like). In some such cases, the lidar window may comprise a surface (e.g., a cylindrical surface, an spherical surface, or a surface having other shapes) that surrounds the lidar such that optical probe beams and reflected optical beams emitted or received along any direction pass through the lidar window such that an optical path between an entrance point to the lidar window and an exit point from the lidar window, is a straight optical path. In some examples, the lidar window can be a cylindrical widow comprising a cylindrical shell having a thickness and the lidar may be placed inside the cylindrical shell (e.g., close to axis of the cylinder). In some cases, a lidar window may be referred to as ring lens. In some cases, the lidar window may have other shapes. For example, the lidar window may comprise a shell comprising an inner surface and an outer surface parallel to a shell axis and having a non-circular cross-section in a plane perpendicular to the axis. In some cases, the lidar window may comprise a conical shell.

In some cases, the detection system 104 may be configured to receive light or light beams within a field of view (FOV) 122 of the detection system 104. For example, lights or light beams that are incident on an entrance aperture of the detection system 104 and propagate along a direction associated with field of view 122, may be received by lidar sensor (e.g., one or more optical-to-electrical converters or photodiodes) of the detection system 104 that generates an electric signal proportional with the power or intensity of the received light. As such, in addition to the reflected optical beam 109 received from the object via a straight optical path, the detection system 104 may receive one or more additional optical beams that propagate toward the entrance aperture of the detection system 104 within the FOV 122 of the detection system 104.

In some cases, an artifact on or inside the lidar window may redirect a portion of light incident on the lidar window such that the redirected portion is trapped and is guided by the lidar window via total internal reflection (TIR). In some such cases, the guided light may be coupled out of the lidar window and reach the lidar causing generation of false and/or erroneous return signals.

For example, a portion of an optical beam reflected by the object 110 may be guided by the lidar window (e.g., propagate within the thickness of the lidar window) and eventually may be scattered toward the entrance aperture of the detection system 104 along a direction within the FOV 122. In some cases, if the intensity of the scattered light propagating toward the entrance aperture of the detection system 104 along a direction within the FOV 122 is higher than a detection threshold of the detection system 104, it may cause the lidar detection system 104 to generate a false return signal. A false return signal may be a return signal that is not associated with a reflection of an optical probe received via a nearly straight or reflection-free optical path from the object. In some cases, a false return signal may indicate the presence of a non-existing or artificial object.

In some cases, the optical probe beam of a lidar may comprise a narrow light beam having low divergence. In some such cases, the divergence of the optical probe beam can be less than 0.1, degrees, less than 1 degrees, less than 5 degrees, or less than 10 degrees. In some cases, the optical probe beam of a lidar may comprise a wide light beam having large divergence. In various embodiments, a lidar system may move rotate one or more optical probe beams over an azimuthal angular range with respect to a rotational axis of the lidar to scan an environment. In some cases, a detection system of a lidar may have a wide or a narrow field of view (FOV). In some cases, a field of view of the lidar may have azimuthal and polar angular widths larger than 10 degrees, larger than 30 degrees, or larger than 50 degrees. In some cases, the field of view of a lidar system may have an azimuthal angular width of about 60 degrees, and a polar angular width of about 50 degrees.

Figures 2A, 2B:
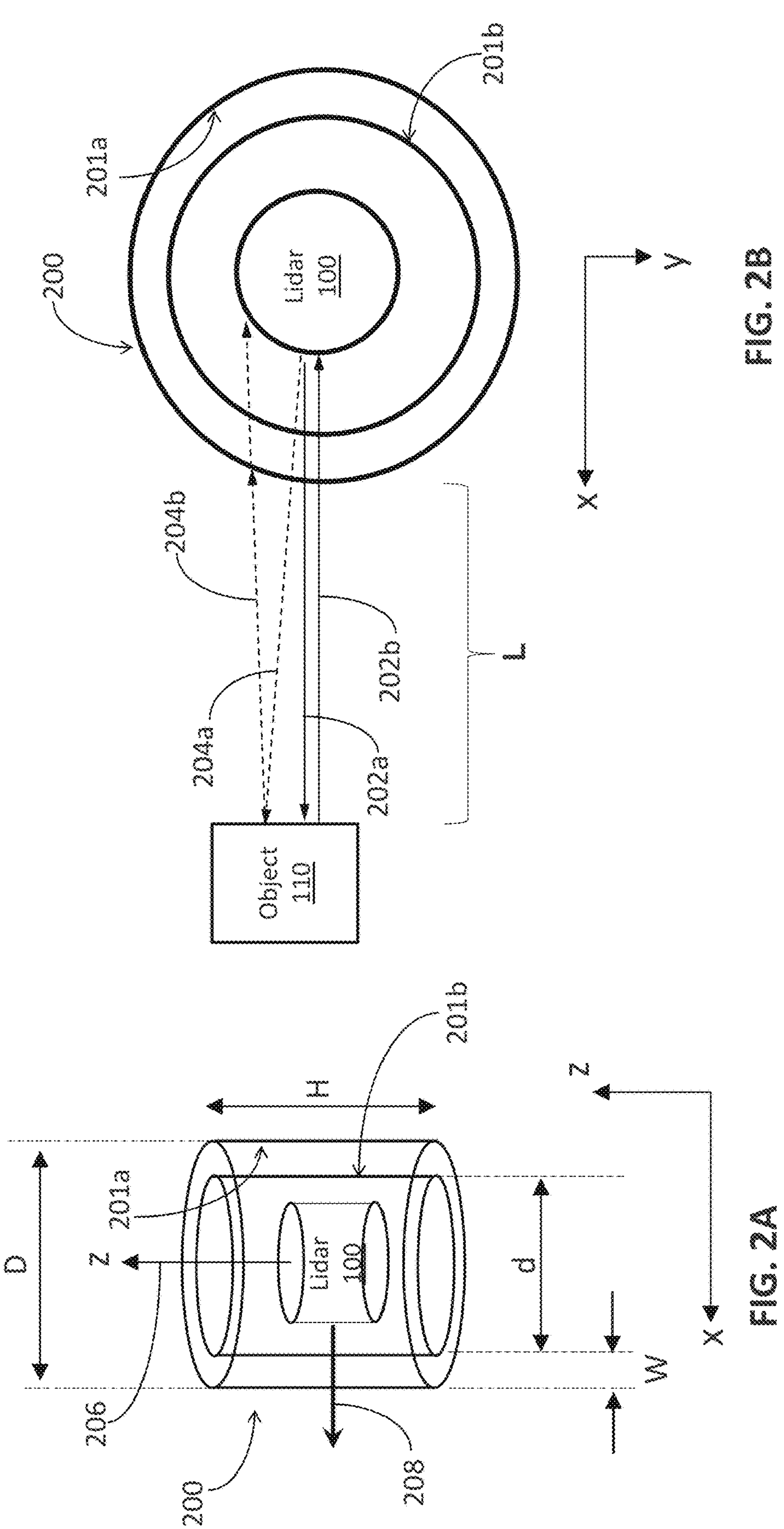
FIG. 2A is a diagram illustrating a perspective view of a lidar having a cylindrical protective window.
FIG. 2B is a diagram illustrating emission of two optical probe beams and reception of the corresponding reflected beams by a lidar having a protective window (lidar window) with a circular cross-section.

FIG. 2A is a diagram illustrating a perspective view of a lidar 100 placed inside a cylindrical lidar window 200. The cylindrical lidar window 200 may comprise a cylindrical shell having an outer diameter (D), an inner diameter (d), an outer surface 201*a*, an inner surface 201*b*, and a thickness (W) substantially equal to a distance between the outer surface 201*a* and the inner surface 201*b* in a radial direction (e.g., a direction perpendicular to the outer surface 201*a* and the inner surface 201*b*). The cylindrical window 200 may have a height (H) extended between a bottom surface and a top surface of the cylindrical shell. In some cases, an antireflection (AR) layer may be disposed on the outer surface 201*a* and/or the inner surface 201*b* of the lidar window 200 to reduce reflection of light by these surfaces. The AR layer may comprise one or more dielectric layers configured to reduce reflection of light having a wavelength within the operating wavelength range of he lidar.

In some examples, the thickness (W) can be from 1 mm to 2 mm, 2 mm to 3 mm, 3 mm to 4 mm, 4 mm to 5 mm or any range formed by any of these values or larger or smaller values.

In some examples, the outer diameter (D) can be from 5 cm to 10 cm, 10 cm to 20 cm, 30 cm to 40 cm, 40 cm to 50 cm, or any range formed by any of these values or larger or smaller values.

In some examples, the height (H) can be from 5 cm to 10 cm, 10 cm to 20 cm, 30 cm to 40 cm, or any range formed by any of these values or larger or smaller values.

In some cases, the window material may comprise different types of glass, thermoplastic polymers (e.g., polycarbonate), or other materials.

In some implementations, the lidar 100 may emit light beams (e.g., laser beams) that rotate around a rotational axis 206 (e.g., z-axis) to scan an environment surrounding the lidar 100. In some cases, the rotational axis 206 can be parallel or may overlap with the axis of the cylindrical lidar window 200 (e.g., axis of symmetry of the cylindrical lidar window perpendicular to its top and bottom surfaces).

At a given time during a rotational period, the lidar may emit a plurality of optical probe beams that propagate to different directions with respect to an emission axis 208. In some examples, the emission axis or direction can be perpendicular to the rotation axis. In some embodiments, the direction of propagation of the plurality of light beams with respect to the emission axis 208 may be within an azimuthal angular range in a plane perpendicular to the rotation axis 206, and within a polar angular range in a plane parallel to the rotational axis 206. In some examples, the plurality of light beams may be associated with a plurality of lidar channels. Each channel of the lidar 100 may emit one or more light beams and light beams emitted by a single lidar channel may be substantially parallel to each other. In some cases, an angle between light beams emitted by a single lidar channel may be less than 2 degrees. In some cases, a number of beams emitted by the lidar may be from 5 to 10, 10 to 20, 20 to 30, 30 to 40, 40 to 50, 50 to 70, 70 to 100, 100 to 200, or any number larger or smaller.

The lidar 100 may emit the plurality of the light beams via a lidar exit aperture. In some cases, the lidar exit aperture may have a height along the rotational axis 206 and a width along a direction perpendicular the rotational axis. In some cases, an individual light beam is emitted by a single channel of the lidar. In some implementations, the plurality of light beams may comprise light beams directed to different directions at different times using a movable optical reflector of the lidar 100. For example, the lidar 100 may comprise a moving mirror that scans the surrounding environment by reflecting a light beam (e.g., a laser beam) generated by a light source (e.g., a laser source) of the lidar in different directions. The mirror may rotate around the rotational axis 206 while its polar angle with respect to the rotational axis 206 is scanned back and forth within a set polar angle range such that during a rotational period the direction of propagation of the reflected light beam varies within the set polar angle range while rotating around the rotational axis 206.

In some cases, the emission axis 208 may rotate around a rotational axis 206 of the lidar 100 with a rotational period or scanning period (T). The plurality of emitted light beams may rotate around the rotational axis 206 such that the propagation direction of each light beam with respect to the emission axis 208 remains constant during a rotation period.

FIG. 2B is a diagram illustrating emission of two optical probe beams and reception of the corresponding reflected beams (reflected off of the object 110) by the lidar 100 placed inside the lidar window 200 (e.g., a cylindrical lidar window). In some cases, an optical probe beam 202*a* emitted by the lidar 100 may become incident on a surface of an object 110 at a normal angle (an angle of incidence of zero). In some such cases, the corresponding reflected optical beam 202*b* (reflection of the optical probe beam 202*a*) may overlap with the optical probe beam 202*a* and may be received by the lidar 100 within its FOV. In some cases, an optical probe beam 204*a* emitted by the lidar 100 may become incident on a surface of the object 110 at a non-zero angle of incidence. In some such cases, the corresponding reflected optical beam 204*b* (reflection of the optical probe beam 202*a*) may propagate back to the lidar along a direction different from the direction of propagation of the optical probe beam 204*a* and may be received by the lidar 100 within its FOV. An angle between the optical probe beam 204*a* and reflected optical beam 204*b* may be less than 2 degrees, or less than 5 degrees. In some implementations, the detection system 104 of the lidar 100 may receive the reflected optical beams 202*b* and/or 204*b* and generate a return signal usable (e.g., by the lidar processing system 106) to determine a distance L between the object 110 and the lidar 100. As shown in FIG. 2B the reflected optical beams 202*b* and 204*b* are transmitted through the lidar window 200 before being received by the lidar 100. The reflected optical beams 202*b* and 204*b* may be transmitted through the lidar window by entering and exiting the thickness of the lidar window 200 via the outer surface 201*a* and inner surface 201*b* respectively. In some cases, more than 90%, 95%, or 98% of the optical intensity (or power) associated with the reflected optical beams 202*b* and 204*b* incident on the lidar window 200 may be transmitted through the thickness (W) of the lidar window 200 and directly reach the lidar 100 without being scattered or reflected by the inner or outer surfaces 201*b*/201*a* of the lidar window 200.

In some implementations, the lidar window 200 may be formed from a material that has a very low optical absorption for light having a wavelength within the operating wavelength range of the lidar. In some cases, an optical absorption of the window material (e.g., used to form a conventional lidar window) may be selected such that attenuation of an optical beam (e.g., a probe or a reflected optical beam) propagating through the window material can be less than 10%, less than 8%, less than 4%, less than 2%, or less than 1% for a propagation distance equal to the thickness (W) of the lidar window 200. In some examples, the window material of a conventional lidar window may be selected such that the reflected optical beams 202*b* and 204*b* are attenuated less than 0.1 dB, less than 0.05 dB, or less than 0.01 dB (due to optical absorption), after passing through the thickness W of the lidar window 200. Thickness of the window can be a distance between the inner surface 201*b* surface and the outer surface 201*a* along a direction normal to the inner surface 201*b* and the outer surface 201*a*.

Generation of False Return Signals By Light Guided within the Thickness of the Lidar Window In some cases, at least a portion of an optical beam incident on a lidar window may be received by the lidar detection system via an indirect optical path after reflection by an object. In some cases, the indirect optical path may include at least one reflection off of a surface of the lidar window. For example, a portion of the incident optical beam 204*b* may be received by the detection system of the lidar 100 via an indirect optical path after being reflected one or more times by the outer surface 201*a* and/or inner surface 201*b* of the lidar window 200. In some cases, the indirect optical path between the object and the lidar can be longer than a distance between the lidar and a first object detected by the lidar. In some such cases, a return signal generated by lidar may falsely indicate that at least a second object is located at a farther distance with respect to the first object, based on the longer delay associated with the indirect optical path. In some cases, at least a portion of the indirect optical path can be bounded by the inner surface 201*b* and outer surface 201*a* of the lidar window 200 and extended from a first position on the inner surface 201*b* or outer surface 201*a* of the lidar window 200 to a second position on the inner surface 201*b* or the outer surface 201*a* of the lidar window 200.

In some cases, the incident optical beam can be a reflection of an optical probe beam. In some cases, the incident optical beam can be a scattering of an optical probe beam. In some cases, the reflected and scattered optical beams may be generated by an object that is detected based on the optical probe beam that generates the reflected and scattered optical beams.

In some cases, a portion of an optical beam incident on the lidar window may be scattered by a first artifact of the lidar window at a first position in a direction different from its original propagation direction of propagation after being reflected or scattered by the object. In some such cases, the portion of the optical beam scattered by the artifact may be guided within the thickness of the lidar window via total internal reflection (TIR) by the inner and outer surfaces of the lidar window. Subsequently the guided light can be scattered out of the thickness of the lidar window by the first or a second artifact at a second position. In some cases, the light that is scattered out of the thickness of the window may propagate toward the detection system of lidar along direction within the FOV of the detection system.

In some cases, an optical path length for the portion of incident optical beam received by the detection system after being guided by the lidar window can be longer than an optical path length for another portion of the incident optical beam that is directly received by the detection system without being scattered and/or reflected (e.g., via a substantially straight optical path).

In some cases, the power or intensity of the portion of incident optical beam received by the detection system after being guided by the lidar window may be large enough (e.g., larger than a detection threshold of the detection system), to cause the detection system to generate a return signal. Such return signal, generated by indirectly received light, may indicate the presence of a non-existing object at a distance longer than the distance between the object from which the incident light beam is originated, and the lidar.

Given that the energy and the intensity of the reflected optical beams propagating toward the lidar decreases according to inverse square law, the optical power and the intensity of the optical beams reflected by near field objects can be much larger (e.g., by a factor larger than $10^2$, $10^3$, $10^6$, $10^9$ or larger), than the energy and the intensity of the optical beams reflected by far field objects up on becoming incident on the lidar window. In some examples, when an object is within the near field range of a lidar, the intensity and/or the power of a reflected optical beam associated with an optical probe beam emitted by the lidar and reflected from the object may be so large that even a small portion of the reflected optical beam received by the detection system via an indirect and guided optical path bound by the thickness of the lidar window, still causes the detection system to generate a return signal. In various examples, the power of the portion of the incident light beam received by the detection system via the indirect path (including a portion guided within the thickness of the lidar window) can be less than 6%, less than 5%, less than 2%, less than 1%, or less than 0.1% of the power of the incident light beam.

In some cases, a near field object can be an object located in the near field range of the lidar and may comprise objects located at a distance shorter than 2 meters from the lidar. In some cases, a far field object can be an object located in the far field range of the lidar and may comprise objects located at a distance longer than 2 meter from the lidar.

In some cases, the generation of false return signals associated with light indirectly received via a guided optical path bound by the thickness of the lidar window may interfere with proper performance of both long range lidars designed for detection of far field objects (e.g., an object located in the far field range of the lidar). For example, in some cases, a portion of an optical probe beam emitted by a far field lidar toward a far field object may be scattered or reflected by a near field object and be transformed to guided light propagating within the thickness of the lidar window by an artifact on the lidar window. Given that the intensity of the reflected optical beams associated with reflection of the of optical probe beams from the far field object can be much lower than the intensity of even a small portion of the same optical probe beam reflected from the near field object, when directed to the detection system, the guided light may cause the generation of larger return signals than those generated by the reflection of the optical probe beam by the far filed object.

In some cases, the artifact on or within the thickness of the lidar window may comprise a drop of water, a particle (e.g., dust particle), a defect in the lidar window (e.g., a local variation of thickness or refractive index or material composition), or any optical scattering center that can redirect at least a portion of the incident light beam from its original direction of propagation or from a path associated with a refraction of light at the interface between the lidar window and the surrounding medium (e.g., air).

In some cases, light received by the detection system of a lidar via an indirect optical path and guided by the lidar window may generate noise and decrease the signal-to-noise ratio of the return signals generated by the reflection of optical probe beams by the near field objects. In some cases, the noise associated with the portion of light received through an indirect optical path and guided by the lidar window may be referred to as near field noise.

In some cases, a portion of incident optical scattered by a small scattering center on or inside the lidar window may generate more than one false return signal. For example, the light guided by the lidar window may propagate several times around the perimeter of the lidar window and during each round trip at least one false return signal may be generated by scattering of a portion of the guided light toward the detection system.

Figure 3A:
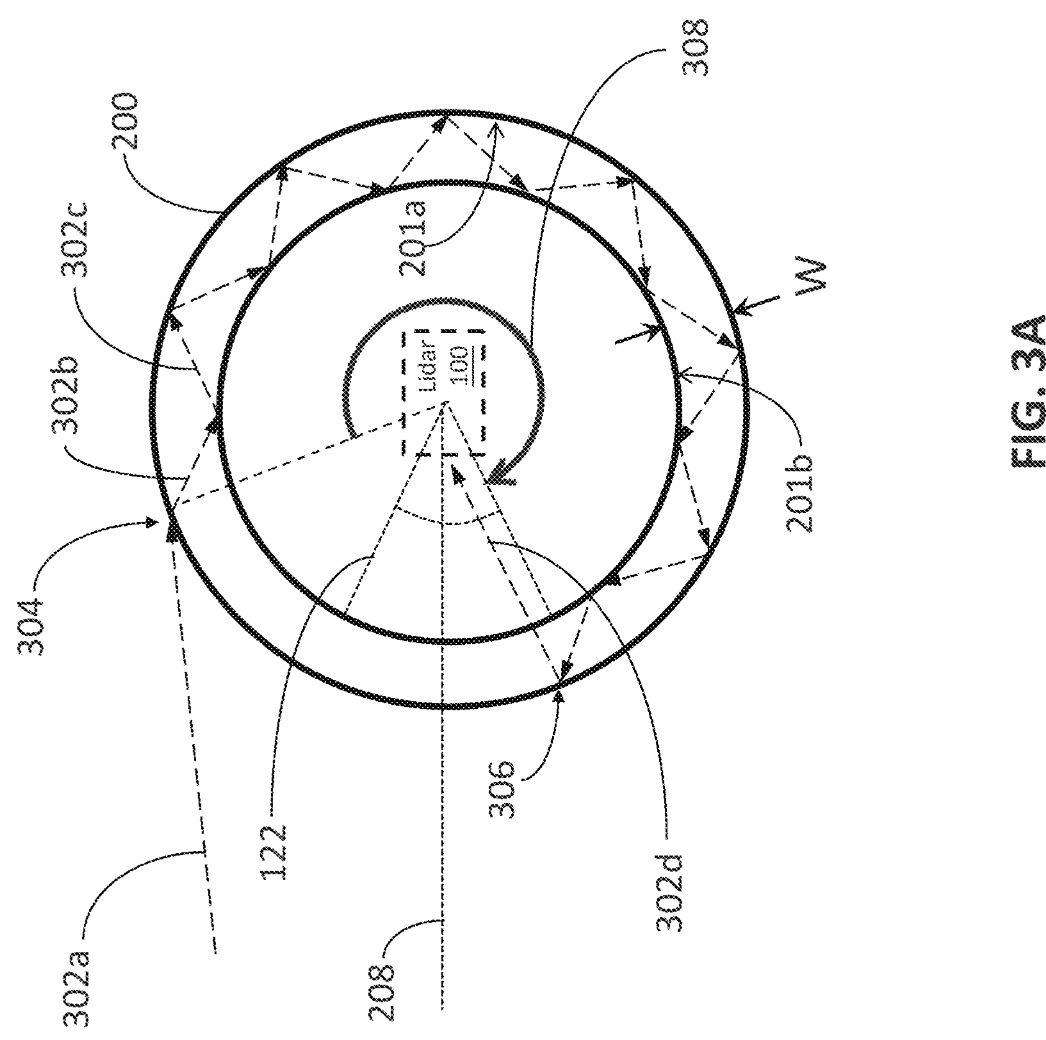
FIG. 3A is a diagram illustrating partial scattering of an optical beam incident on the lidar window and reception of the resulting guided optical beam by the lidar detection system.

FIG. 3A is a diagram illustrating an optical beam 302*a* incident on the lidar window 200 at a first point 304 on the lidar window 200. In some cases, the optical beam 302*a* can be a reflected optical beam or a scattered optical beam associated with an optical probe beam sent by the lidar 100 placed inside the lidar window 200. The first point may include a first artifact that scatters a portion of the optical beam 302*a* such that the resulting scattered optical beam 302*b* becomes incident on the inner surface 201*b* of the lidar window 200. In some cases, the angle of incidence of the optical beam 302*b* with respect to the inner surface 201*b* can be equal or larger than the critical angle ($\theta_c$) for an interface between air and a material from which the lidar window is composed of. For example, the angle of incidence of the optical beam 302*b* on the inner surface 201*b* can be larger than $\mathrm{Sin}^{-1}(1/n)$ where n is the refractive index of the material for light having a wavelength substantially equal to the wavelength of the incident optical beam 302*a*. In some cases, the optical beam 302*b* may be partially or totally reflected by the inner surface 201*b* and the resulting reflected optical beam 302*c* may become incident on the outer surface 201*a*. In some cases, the angle of incidence of the optical beam 302*c* with respect to the outer surface 201*a* can be equal or larger than the critical angle ($\theta_c$). The optical beam 302*c* can be partially or totally reflected for a second time by the outer surface 201*a* and become incident on the inner surface 201*b* again. This sequence of being reflected by the inner surface 201*b* and the outer surface 201*a* of the lidar window may be repeated several times resulting in propagation of guided light within the thickness of the lidar window 200. In some cases, the portion of incident beam 302*a* scattered by the first scattering center may be coupled into a bound optical mode of the lidar window (bounded by the inner and the outer surfaces of the lidar window). In such cases, the lidar window may function as an optical waveguide that guides the scattered portion of the incident beam 302*a* around the perimeter of the lidar window. In some cases, a second artifact may scatter at least a portion of the guided light (or the optical mode) out of the thickness of the lidar window 200. In some examples, the first and second artifacts can be on the inner surface 201*b*, on the outer surface 201*a*, or within the thickness of the lidar window 200.

In the example shown in FIG. 3A, the guided optical beam may be scattered by a second artifact at a second point 306 of the outer surface 201*a* of the lidar window 200 toward the lidar 100 along a direction within the FOV 122 of the lidar system 100 (FOV of the detection system of the lidar). A relative angular position 308 between the first point 304 from which the guided propagation of the scattered optical beam 302*b* starts and the second point 306 at which the guided optical beam is coupled out of the thickness of the lidar window may be larger than 180 degrees, 200 degrees, 270 degrees, or 300 degrees.

In some cases, the position of the second artifact (e.g., point 306) and the direction of the propagation of the optical beam 302*d* scattered by the second artifact, can be such that the scattered optical beam 302*d* (light coupled out of the thickness of the window) propagates in a direction within the FOV 122 of the detection system toward the aperture of the lidar detection system. In some such cases, where the optical intensity (or power) of the scatted optical beam 302*d* is larger than a threshold intensity (or threshold power) detectable by the detection system, the scatted optical beam can cause the generation of a return signal (a false return signal) by the lidar detection system. Such return signal may falsely indicate the presence of an object in a direction along which the scattered light has been received by the detection system. In some cases, where the incident optical beam 302*a* is associated with a reflection of an optical probe signal by an object, the false return signal may indicate an incorrect distance between the object and the lidar that is substantially equal to a distance between the object (from which the incident optical beam 302*a* is originated) and the lidar 100 plus an artificial distance associated with the guided optical path length between the first point 304 and the second point 306.

In some cases, the first point 304 and the second point 306 can be in a plane perpendicular to an axis (e.g., z-axis) of the lidar window 200 and the guided light may propagate within the same plane. In some other cases, the first point 304 and the second point 306 can be in two different planes perpendicular to the axis (e.g., z-axis) of the lidar window 200 and the guided light may propagate along a spiral shape optical path.

In some cases, the light guided by the lidar window 200 may propagate inside the thickness of the lidar window 200 several times around the perimeter of the lidar window 200. In some such cases, during each round trip, a portion of the guided optical beam may be coupled out of the thickness of the window by one or more artifacts along the perimeter of the lidar window. Some of the optical beams coupled out of the thickness of the window may propagate toward the lidar detection system within the FOV of the detection system. In these cases, if the portions of the guided light scattered toward the lidar detection system have optical intensities (or powers) larger than a threshold intensity (or power) detectable by the lidar detection system (detection threshold of the lidar detection system), one or more false return signals may be generated by the detection system during each round trip of the guided optical beam. Each false return signal may indicate a false distance between the non-existing object and the lidar. As such, a single artifact or scattering center around the perimeter of the window may generate multiple false return signals associated with the scattering of light by the artifact during different round trips.

In some cases, where the incident optical beam (a portion of which is converted to guided light) is associated with interaction of an optical probe signal with an object, a false return signal generated by a scattered optical beam 302*d* coupled out of the lidar window after N full roundtrips around the perimeter of the lidar window may indicate that a distance between the non-existing object and the lidar is substantially equal to a distance between the object (from which the incident optical beam is originated), and the lidar, plus an artificial distance associated with N roundtrips and an optical path length within the thickness of the lidar window between the a first artifact that transforms a portion of the incident optical beam to guided light and a second artifact that scatters a portion of the guided light toward the detection system.

With continued reference to FIG. 3A, in some examples, the guided light generated at point 304 may complete N roundtrips around the lidar window 200 (starting from point 304 back to point 304, or 360 degrees rotation), before being scattered toward the detection system at point 306. Assuming that a relative angular position 308 between point 304 and point 306 is $\phi$ degrees, the artificial distance indicated by the return signal generated by the scattered optical beam 302*d* can be estimated as $[N+(\phi/2\phi)]\times n_e \times \pi D_a$ where $n_e$ is the effective refractive index for propagation of guided light within the thickness of the lidar window 200, and $D_a$ is the average diameter of the lidar window. In some cased $D_a$ may be estimated as (D+d)/2.

As described above the sensor of the detection system may include multiple sensing elements (pixels) to convert the received light to photocurrent. In some cases, these sensing elements may be located at different positions with respect to an entrance window of the detection system. In some cases, as the lidar steers an optical probe beams, a group of pixels may be activated at substantially the same time. In some such cases, when reflected light from an object is scattered by an artifact (e.g., on or within the lidar window) and the resulting guided light is received by the detection system, the activated group of pixels may generate photocurrents indicative of the presence of multiple artificial objects forming a first halo around the actual object from which the reflected light is received. In some cases, when the guided light propagates within the thickness of the window multiple roundtrips, multiple halos may be formed indicating different distances farther from the lidar than the actual object and the first halo (e.g., as a result of guided light coupled out of the window thickness).

Figure 3B:
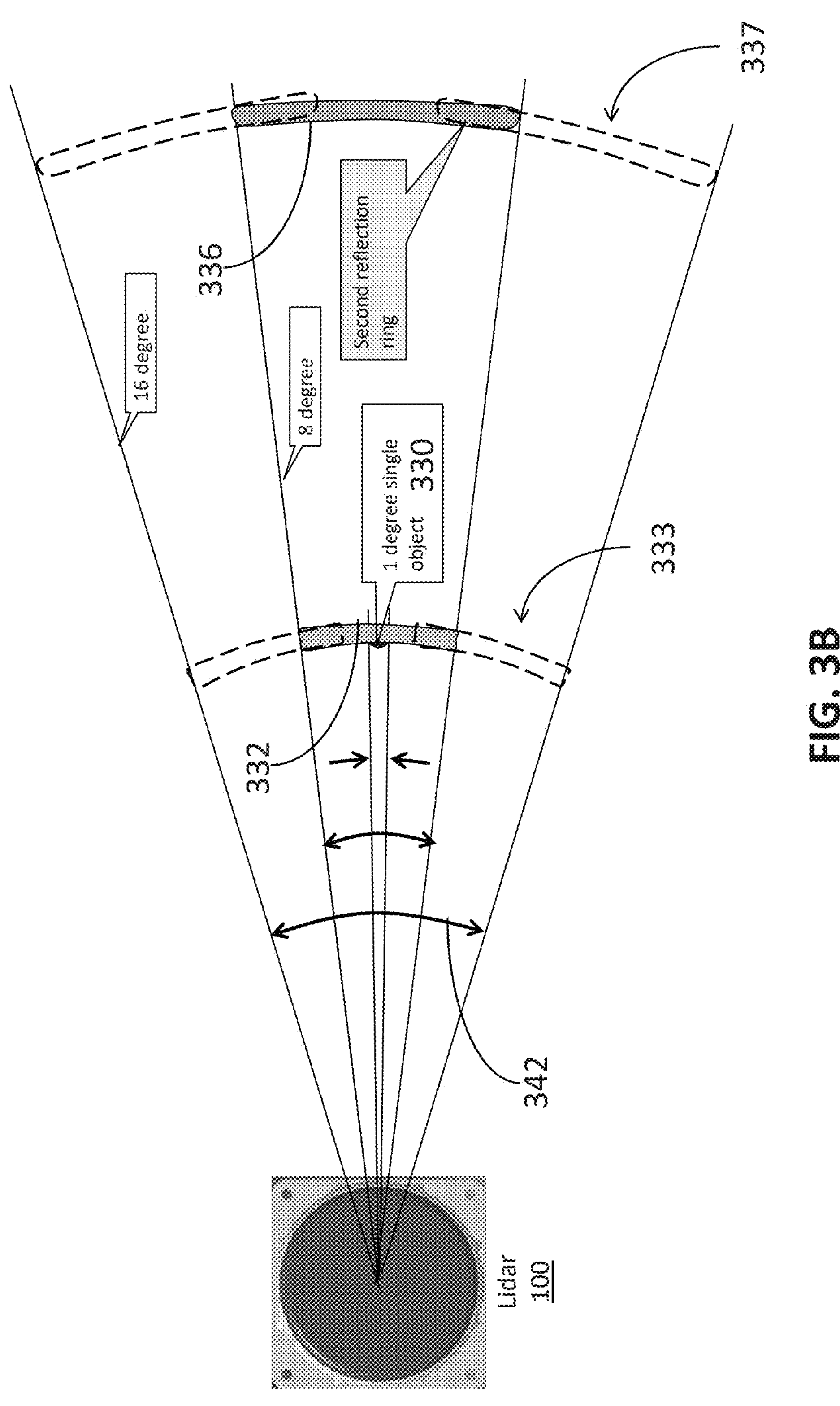
FIG. 3B is a diagram illustrating a scenario where the lidar system receives multiple guided optical beams via the lidar window causing generation of false positive return point clouds covering an azimuthal angle larger than that of the actual angular width of the single near field object (from which the reflected optical beams are received), and false return point clouds at multiple distances.

FIG. 3B is a diagram is an example illustrating the impact of receiving multiple guided optical beams via the lidar window by the lidar detection system, on the detected angular width of an object and the identification of multiple artificial objects having artificially expanded angular widths. FIG. 3B shows that when the lidar system receives multiple guided optical beams via the lidar window, reflected optical beams from a single near field object can generate false positive return point clouds covering an azimuthal angle larger than that of the actual angular width of the single near field object, and also produce false point clouds at multiple distances. In the example shown, reflection of an optical probe beam by a small object 330 having an angular width of 1 degree may cause the detection system to generate multiple return signals indicative of multiple points forming a first halo 333 and a second halo 337 where a total angular width 342 of the first and the second halo is about 32 degrees and an angular width of a first section 332 of the first halo 333 and the first section 336 of the second halo 337 is about 16 degrees. In some cases, the first halo may be associated with the scattered portion of the guided light during the first roundtrip and the second halo may be associated with the scattered portion of the guided light during the second roundtrip. As such, in the presence of artifacts (scattering centers) on or inside the window, a single small near field object can cause the generation of return signals indicative of clouds of concentric artificial points.

Figure 4A:
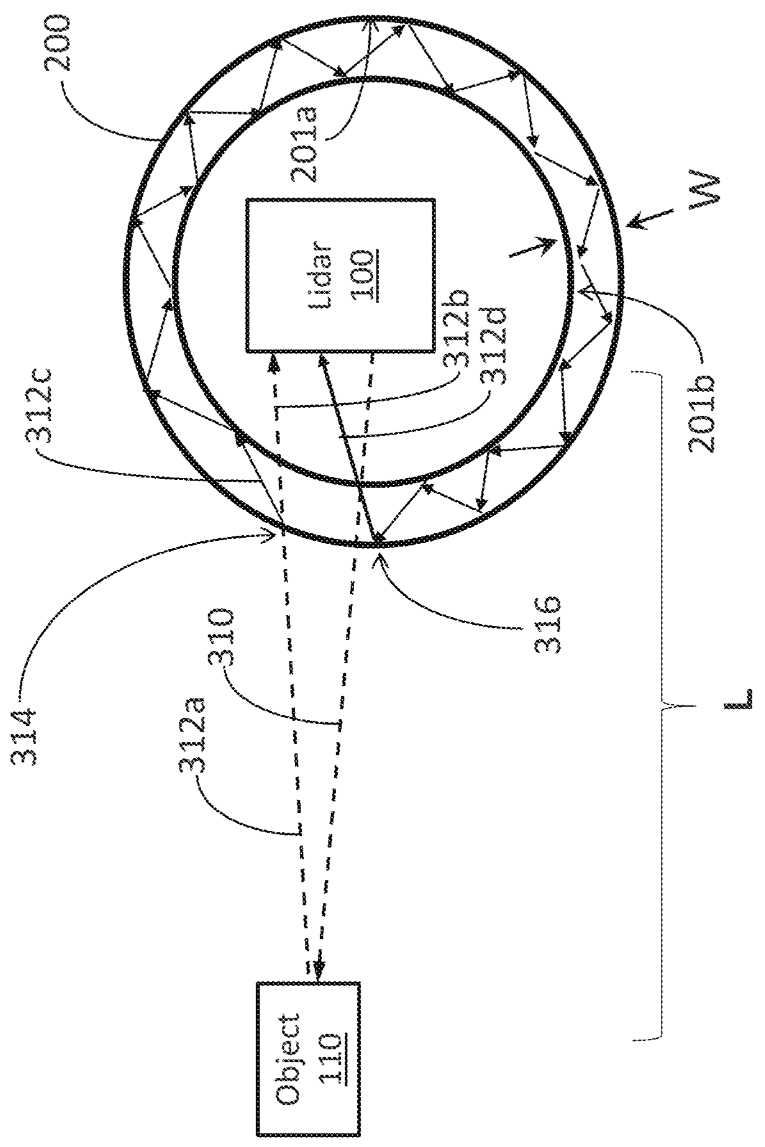
FIG. 4A is a diagram illustrating partial scattering of a reflected optical beam incident on the lidar window by artifacts of the lidar window, and reception of the resulting guided optical beam by the lidar detection system.

FIG. 4A is a diagram illustrating an example detection of an object 110 by a lidar 100 surrounded by a lidar window 200 having one or more scattering centers. In some cases, the object 110 can be an object located in a near field range of the lidar 100. The scattering centers can be on the surface or within the lidar window 200. The lidar 100 may emit an optical probe beam 310 that passes through the thickness (W) of the lidar window 200 and propagates toward the object 110. A surface of the object 110 may reflect at least a portion of the incident optical probe beam 310 toward the lidar window 200. In some cases, reflection of the incident optical probe beam 310 off of the object 110 can be a specular reflection. The reflected optical beam 312*a* may become incident on a point 314 on the surface of the lidar window 200. In some cases, at least a portion 312*b* of the reflected optical beam 312*a* may be transmitted through the thickness (W) of the lidar window 200, without being scattered or reflected, and become incident on the detection system of the lidar 100 causing the detection system to generate a return signal indicating the presence of the object 110 at a distance L from the lidar 100. In some cases, a scattering center (e.g., a dust particle, a drop of water, a surface defect, or a defect underneath the surface) located at the point of incidence 314, may partially scatter at least a portion 312*c* of the reflected optical beam 312*a* and cause that potion to propagate and be guided within the thickness (W) of the lidar window 200 along an optical path bound by inner surface 201*b* and outer 201*a* surfaces of the lidar window 200. In some cases, at some point (e.g., point 316) around the perimeter of the lidar window a portion 312*d* of the guided portion 312*c* of the reflected optical beam 312*a* may be scattered toward the lidar 100 by another scattering center. In some such cases, when the optical beam 312*d* (the portion of the guided light that is scattered out of the thickness of the window) is received by the detection system and its intensity exceed a detection threshold of the detection system may cause the generation of a false return signal indicating that a second object (an artificial object) is located at a distance of L+S1 where S1 is the longer optical path length between the point 314 and the point 316 bound by the thickness of the lidar window.

Figure 4B:
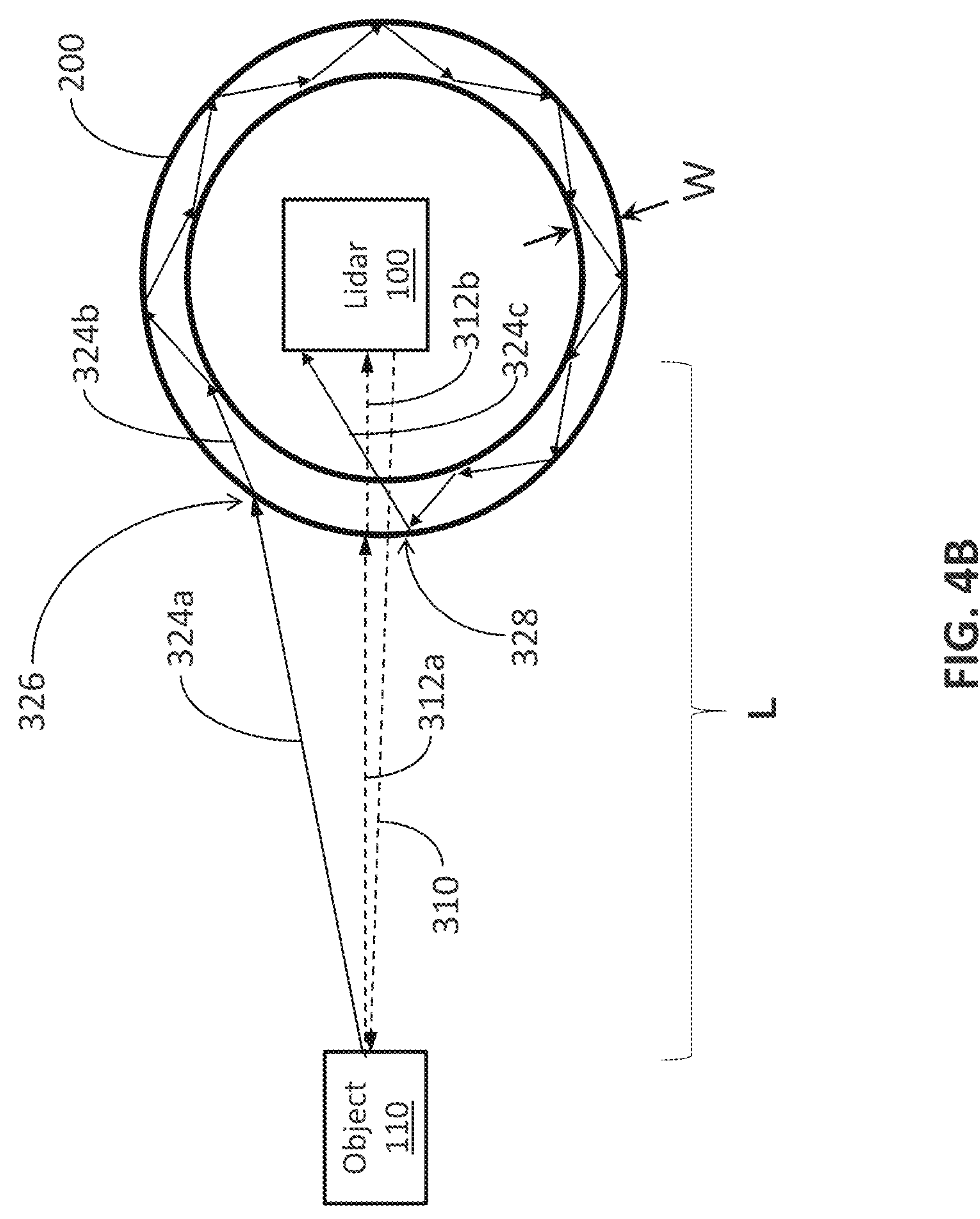
FIG. 4B is a diagram illustrating partial scattering of a scattered optical beam incident on the lidar window by artifacts of the lidar window, and reception of the resulting guided optical beam by the lidar detection system.

FIG. 4B is a diagram illustrating another example of detection of an object 110 by a lidar 100 surrounded by a lidar window 200 having one or more scattering centers. In this example, reflection of the incident optical probe beam 310 off of the object 110 may comprise diffuse reflection or diffraction, in addition to the specular reflection. In some cases, at least a portion of the reflected optical beam 312*a* may be transmitted may be transmitted through the thickness (W) of the lidar window 200 and become incident on the detection system of the lidar 100 causing the detection system to generate a return signal indicating the presence of the object 110 at a distance L from the lidar 100. In some cases, a portion 324*a* of the incident optical probe beam 310 that is diffused or scattered by the object 110 may become incident on a point 326 on the lidar window 200. In some such cases, a scattering center located at the point of incidence 326, may partially scatter at least a portion 324*b* of the scattered or diffused optical beam 324*a* and cause that potion to propagate within the thickness (W) of the lidar window 200 along an optical path bound by inner surface 201*b* and outer 201*a* surfaces of the lidar window 200. At some point (e.g., point 328) around the perimeter of the lidar window a portion 324*c* of the guided portion 324*b* can be scattered toward the lidar 100 by another scattering center. When the optical beam 324*c* (the portion of the guided light that is scattered out of the thickness of the window) is received by the detection system and its intensity exceed a detection threshold of the detection system may cause the generation of a false return signal indicating that a second object (an artificial object) is located at a distance of L+S2 where S2 is the longer optical path length between the point 326 and the point 328 bound by the thickness of the lidar window.

With reference to FIGS. 4A and 4B, the false return signals generated by the portion of guided light scattered out of the thickness of the lidar window (e.g., optical beams 312*d* and 324*c*) may cause the lidar system to falsely indicate that multiple objects object are located at different distances from the lidar (instead of a single object).

In various implementations, the lidar window can be configured to reduce the probability of false return signal generation by the portion of guided light scattered out of the thickness of the lidar window 200 (e.g., optical beams 312*d* and 324*c*). In some examples, optical propagation loss for light propagating inside the thickness of the lidar window may be increased to reduce the intensity of the guided light. In some examples, a shape of the window may be tailored to direct the guided light away from the field of view of the detection system of the lidar.

Attenuating Light Propagating within the Thickness of the Lidar Window

As described above, a portion of light guided within the thickness of the lidar window 200 may be scattered by an artifact (a scattering center) in a direction within an FOV 122 of the detection system of the lidar 100 and therefore can be received and detected by the detection system. In some cases, when the intensity of an optical beam incident on the lidar window (e.g., incident optical beams 302*a*, 312*a*, or 324*a* in FIGS. 3A, 4A, and 4B) is large enough (e.g., when the object 110 is a near field object), the intensity of the portion of guided light that is received by the detection system may exceed a threshold intensity (detection threshold) required to cause the detection system to generate a false return signal. In some cases, the threshold intensity or the detection threshold can be the intensity above which a photocurrent generated by a sensor of the detection system becomes larger than a background photocurrent (or background noise) of detection system. A false return signal may be indicative of a false or erroneous distance between the lidar and an object or the presence of a non-existing object at an artificial distance. A false distance may comprise a distance between the lidar and an object, and an artificial distance associated with an optical path length between the entry point though which an optical beam incident on the lidar window is transformed (e.g., an artifact) to light guided by the boundaries of the lidar window (e.g., the inner surface 201*b* and outer 201*a* surface) and an exit point from which light is scattered toward the detection system. In the examples shown in FIGS. 3A, 4A, and 4B, the artificial distance can be the length of an optical path between the points 304 and 306, 314 and 316, or 326 and 328, where the optical path is bound by the inner surface 201*b* and outer 201*a* surfaces of the lidar window. In some cases, the artificial distance can be the longer optical path between the points 304 and 306, 314 and 316, or 326 and 328, where the optical path is bound by the inner surface 201*b* and outer 201*a* surfaces of the lidar window. In some cases, the artificial distance can be estimated as $[N+(\phi/2\phi)]\times n_e \times \pi D_a$ where $n_e$ is the effective refractive index for propagation of guided light within the thickness of the lidar window, $D_a=(D+d)/2$ is the average diameter of the lidar window, N is an integer (0, 1, 2, 3, . . . ) and $\phi$ is the larger angular difference between the points 304 and 306, 314 and 316, or 326 and 328. In some cases, $\phi$ can be a reflex angle. In some cases, $\phi$ can be the smaller angular distance between the points 304 and 306, 314 and 316, or 326 and 328.

In some implementations, a lower limit for the optical absorption coefficient of the lidar window material may be selected such that for a given range of powers (or intensities) of an incident optical beam (e.g., incident optical beams 302*a*, 312*a*, or 324*a*), the powers (or intensities) of the respective light beams scattered out of the lidar window (e.g., optical beams 302*d*, 312*d*, and 324*c*), stay below the detection threshold intensity of the detection system. In these implementations, the upper limit for the optical absorption coefficient may be determined based on the thickness (W) of the lidar window such that for the range of powers (or intensities) of optical probe beams emitted by the lidar, the corresponding reflected optical beams (e.g., reflected optical beam 312*a* in FIGS. 4A and 4B) received from the object, after passing through the window via direct path, are detectable by the lidar detection system. In some cases, both the lower and upper limits of the optical absorption for the lidar window may be estimated based at least in part on a power (or intensity) range of the optical probe beams (e.g., optical probe beam 310) emitted by the lidar and an operating distance (or detection range) the lidar.

In some cases, the window material may be selected such that the attenuation of light having a wavelength within the operating wavelength range of the lidar and propagating inside the window material is more than 10 times, 100 times, 1000 times, or 10000 times larger for a first propagation distance equal to a selected, calculated, or estimated attenuation distance for the lidar system, compared to a second propagation distance equal to the thickness (W) of the lidar window. In some cases, the attenuation distance can be substantially equal to an artificial distance associated with propagation of guided light within the lidar window. The thickness (W) of the lidar window (also referred to as window thickness) can be a distance between the inner surface and the outer surface of the lidar window along a direction normal to the inner surface and the outer surface of the lidar window.

In some examples, an attenuation distance can be the length of a guided optical path between a first point (e.g., point 304, 314, or 326) where the first artifact scatters a portion of an optical beam incident on the window (e.g., incident optical beams 302*a*, 312*a*, or 324*a*) and a second point (e.g., point 306, 316, or 328), where the guided optical path passes through the thickness of the lidar window (e.g., the lidar window 200) and is bound by the inner and outer surfaces of the lidar window. In some cases, the attenuation distance can be the longer guided optical path between the first and the second point. In some cases, the attenuation distance can be the shorter guided optical path between the first and the second point.

In some implementations, the attenuation distance may be estimated based at least in part on a diameter of the lidar window (e.g., inner diameter, d, outer diameter, D) and the FOV of the lidar detection system. In some cases, the operating distance range of the lidar (e.g., near field or far filed), and/or certain characteristics of objects in the environment may be taken into account in the estimation of the attenuation distance.

In some cases, the attenuation distance can be estimated as $[N+(\phi/2\phi)]\times n_e\times\pi D_a$ where $D_a=(D+d)/2$ is the average diameter of the lidar window, and Nis an integer (0, 1, 2, 3, . . . ). In some cases, $\phi$ is the angular difference between a first point (e.g., point 304, 314, or 326) where the first artifact scatters a portion of an optical beam incident on the window (e.g., incident optical beams 302*a*, 312*a*, or 324*a*) and a second point (e.g., point 306, 316, or 328) from which the corresponding guided light is scattered toward the lidar 100, where the path is bound by the inner and outer surfaces of the lidar window. In some cases, $\phi$ can be the smaller angular distance between the first and the second points. In some cases, $\phi$ can be a reflex angle. In some cases, $\phi$ can be the smaller angular distance between the first and the second points. In some cases, $\phi$ can be an acute or obtuse angle.

In some cases, the attenuation distance may be substantially equal to the circumference ($\pi\times D$) or an average circumference ($\pi\times D/2+\pi\times d/2$) of the lidar window. In various implantations, the attenuation distance of a lidar can be from 20 cm to 30 cm, from 30 cm to 50 cm, from 50 cm to 100 cm, from 100 cm to 500 cm, from 500 cm to 1000 cm or any range formed by any of these values or larger or smaller values.

With reference to FIGS. 3A, 4A, and 4B, in some cases, the window material may be selected such that the propagation of guided light inside the thickness of the window from the first point to the second point attenuates the guided light such that the intensity of the optical beam coupled out of the thickness of the window at the second point (e.g., optical beams 302*d*, 312*c*, 324*c*) is more than 10 times, more than 100 times, more than 1000 times, or more than 10000 times smaller than the intensity of the portion of the incident beam scattered at the first point (e.g., optical beams 302*b*, 312*b*, 324*b*) and launches the guided light. In some cases, the window material may be selected such that after propagating inside the thickness of the window for a distance equal to the propagation distance, guided light is attenuated more than 10 times, more than 100 times, more than 1000 times, or more than 10000 times.

In various implementations, for a lidar window (e.g., the cylindrical lidar window 200) having a given outer diameter (D) and thickness (W), the attenuation of light propagating within the thickness of the lidar window between a first and a second point around the perimeter of the lidar window may be tailored by selecting the window material and/or adjusting the composition of a given window material. For example, the window material may be selected to have an optical absorption coefficient larger than a minimum or lower limit value determined based on the attenuation distance estimated for the lidar and the lidar window. Further, the window material may be chosen to have an optical absorption coefficient smaller than a maximum or upper limit value estimated based at least on the thickness (W) of the lidar window.

The lower and upper limit values for the optical absorption coefficient of the window material may be values associated with absorption of light having a wavelength within the operating wavelength range of the lidar. In some implementations, the lower and upper limit values for the optical absorption coefficient of the window material may be estimated based at least in part on an intensity or an intensity range of the optical probe beams (e.g., optical probe beam 310) emitted by the lidar.

In some examples, a light beam having an initial intensity of $I_0$ may be attenuated according to the equation $I(z)=I_0\times e^{-\alpha z}$, where I(s) is the intensity of the beam after propagating z centimeter in a material having an absorption coefficient of $\alpha$ (unit: $cm^{-1}$) for the wavelength of the light beam. As such passing through the thickness (W) of the lidar window along a radial direction perpendicular to the surface of the window may attenuate an optical beam by $e^{-\alpha W}$, and propagation in window material for distance equal to the attenuation distance(s) may attenuate an optical beam by $e^{-\alpha s}$. Accordingly, a first beam of light propagating inside the window material along a propagation distance equal to the attenuation distance of the lidar may be attenuated $e^{\alpha(s-W)}$ times more than a second beam of light propagating inside he window material along a propagation distance equal to window thickness (W).

The relation between the intensity $I_1$ of an incident beam (e.g., 302*a*, 312*a*, or 324*a*) and the intensity $I_2$ of a corresponding light beam coupled out of the window thickness and received by the lidar detection system may be written $I_2=I_1\times e^{-\alpha(s-w)}\times\beta_{entry}\times\beta_{exit}$, where $\beta_{entry}$ and $\beta_{exit}$ are the entry and exit coupling efficiency coefficients. For example, $\beta_{entry}\times I_2$ can be the intensity of guided light generated by the incident beam at a point of incidence (e.g., points 304, 314, 326). If the intensity of guided light at an exit point (e.g., points 306, 316, 328) is $I_3$, the intensity of the light coupled out of the window thickness at the exit point can be $\beta_{exit}\times I_3$. The relation between the intensity $I_1$ of an incident beam (e.g., 312*a*) and the intensity $I_4$ of a corresponding light beam passing through the thickness (W) of the lidar window along a radial direction perpendicular to the surface of the window may be written $I_4=I_1\times e^{-\alpha(s-w)}\times\gamma$, where $\gamma$ is the transmission coefficient for air-window and window-air at near normal incidence. Accordingly, the ratio between the attenuation of light received by the lidar detection system via a guided optical path having a length equal to the attenuation distance(s) and attenuation of light received by the lidar detection system via a direct optical path through the window can be expressed as $[(\beta_{entry}\times\beta_{exit})/\gamma]\times e^{\alpha(s-W)}$.

In some cases, the lower limit for the optical absorption coefficient of the window material can be estimated using the inequality $e^{\alpha(s-W)}>M1$ or $\alpha>\ln(M1)/(s-W)$, where M1 is a desired factor by which attenuation through the attenuation distance of the lidar should exceed attenuation though the thickness of the lidar window (where ln represents natural logarithm). In some case, M1 can be from 10 to 100, from 100 to 1000, from $10^3$ to $10^4$, from $10^4$ to $10^5$, or any range formed by any of these values or larger or smaller values.

In some cases, the lower limit for the optical absorption coefficient of the window material can be estimated using the inequality $e^{-\alpha s}<M2$ or $\alpha>\ln(M2)/s$, where M2 is a desired factor by which an optical beam should be attenuated after propagating in the window material for a distance equal to the attenuation distance of the lidar. In some cases, M2 can be from 5 to 10, from 10 to 100, from 100 to 1000, from $10^3$ to $10^4$, from $10^4$ to $10^5$, or any range formed by any of these values or larger or smaller values.

In some cases, an upper limit for the optical absorption coefficient of the window material can be estimated using the inequality $e^{-\alpha W>M}3$ or $\alpha<-\ln(M3)/W$, where 100×M3 is a desired transmittance of an optical beam passing through the thickness (W) of the lidar window in a radial direction perpendicular to the surface of the lidar window. In some cases, M3 can be from 90% to 94%, from 94% to 97%, or from 97% to 100%.

In some cases, the lower limit for the optical absorption coefficient of the window material can be estimated using the inequality $[(\beta_{entry}\times\beta_{exit})/\gamma]\times e^{\alpha(s-W)}>M4$ or $\alpha>\ln(M1/[(\beta_{entry}\times\beta_{exit})/\gamma])/(s-W)$, where M4 is a desired factor by which the intensity of a first portion of an incident optical beam received by the detector system via an indirect guided optical path (within the thickness of the window), should be smaller than a second portion of the incident optical beam received by the detector system via a direct optical path (passing through the thickness of the window). In some case, M4 can be from 5 to 10, from 10 to 100, from 100 to 1000, from $10^3$ to $10^4$, from $10^4$ to $10^5$, or any range formed by any of these values or larger or smaller values.

In various implementations, an upper limit for the optical abortion of the window material can be from 1 $cm^{-1}$ to 2 $cm^{-1}$, from 2 $cm^{-1}$ to 3 $cm^{-1}$, from 3 $cm^{-1}$ to 5 $cm^{-1}$ or any range formed by any of these values or larger or smaller values. In various implementations, a lower limit for the optical abortion of the window material can be from 0.05 $cm^{-1}$ to 0.07 $cm^{-1}$, from 0.07 $cm^{-1}$ to 0.1 $cm^{-1}$, from 0.1 $cm^{-1}$ to 0.5 $cm^{-1}$ or any range formed by any of these values or larger or smaller values.

In some examples the lower limit of the optical absorption coefficient may be the value of absorption coefficient required to reduce the probability of generation of false positive signals associated with light guided within the thickness of the lidar window below a threshold value.

In some cases, the lower limit of the optical absorption coefficient may be estimated based on the longer guided optical path length between a first point from which an incident optical beam can be scattered and guided by the lidar window and a second point from which the guided light can be redirected toward the detection system and generate a return signal. In some examples, the location of the second point, may be determined based at least in part on the FOV of the lidar detection system.

In some cases, the lower limit of the optical absorption coefficient may be estimated based on the shorter optical path length between a first point from which an incident optical beam can be scattered and guided by the lidar window and a second point from which the guided light can be redirected toward the detection system and generate a return signal. In some examples, the location of the second point, may be determined based at least in part on the FOV of the lidar detection system.

In some cases, the longer and the shorter optical path length between the first point and the second point for a lidar window may be determined based at least on the diameter of the lidar window, thickness (W) of the lidar window, and the FOV of the detection system of the lidar inside the lidar window.

In some cases, the longer optical path length between the first point and the second point for a lidar window may be determined based at least on the diameter or average diameter of the lidar window, thickness (W) of the lidar window, and the FOV of the detection system of the lidar inside the lidar window.

In some cases, the lower limit of the optical absorption coefficient for a lidar window may be a value of the optical absorption coefficient required to attenuate an optical beam having a wavelength within the operating wavelength range of the lidar by a factor of M after propagation along an optical path having a length equal to an attenuation distance determined for the lidar window. In some cases, the lower limit for the optical absorption coefficient for a lidar window may be a value of the optical absorption coefficient required that makes the attenuation of light having a wavelength within the operating wavelength range of the lidar and propagating inside the window material more than M times larger for a first propagation distance equal to the attenuation distance determined for the lidar window compared to a second propagation distance equal to the thickness of the lidar window. In various implementations, M can be larger than 10, 100, 1000, $10^4$, $10^5$, $10^6$, but smaller than $10^7$.

In some cases, the attenuation distance for a lidar window can be equal to the circumference, an average circumference, a portion of the circumference, or a portion of the average circumference of the lidar window. The circumference of the lidar window can be the perimeter of a circular cross-section of the lidar window in a plane perpendicular to axis of symmetry of the lidar window parallel to the inner and outer surfaces of the lidar window. As such, the lower limit for the optical absorption coefficient for a lidar window (or material from which the lidar window is formed), may be determined based at least in part on a diameter or average diameter of the lidar window. In some cases, where a cross-section of the lidar window is non-circular (e.g., cross-section in a plane perpendicular to the surface of the lidar window), the average diameter of the lidar window may be estimated based on a maximum diameter and a minimum diameter of an outer surface of the lidar window, or by integrating a variation of the diameter of the outer surface of the lidar window.

In some cases, an upper limit for the optical absorption coefficient of the window material can be a value the optical absorption coefficient required that makes the attenuation of light having a wavelength within the operating wavelength range of the lidar and propagating inside the window material for a distance substantially equal to the thickness (W) of the window less than 10%, less than 5%, less than 3%, less than 2%, or lower.

In some examples, the window material may comprise a doped glass or doped polymer comprising a dopant. The optical absorption coefficient of the window material may be adjusted by changing a concentration of a dopant (e.g., a dye) inside the glass or the polymer. The absorption spectrum of the dopant may have an absorption line that at least partially overlaps with the operating wavelength range of the lidar. In some cases, the absorption line may include wavelengths within an absorption bandwidth centered at a peak absorption wavelength of the dopant. In some cases, the wavelength of optical probe beams are within the absorption line of the dopant. For example, a spectral distance between the wavelength of the optical probe beams emitted by the lidar and the peak absorption wavelength of the absorption line of the dopant, can be less than the absorption bandwidth of the corresponding absorption line. In some cases, the absorption line of the dopant can be within an operating wavelength range of a sensor used in the lidar detection system. In some cases, the lidar widow may be fabricated using injection molding. In some such cases, the concentration of a dopant (e.g., a dye) inside the window may be tailored by adjusting the concentration of the dopant in the molten material before injection into the mold. An upper limit for the concentration of the dopant in the window material may be determined at least in part based on an estimated upper limit for optical absorption coefficient of the window material. In some cases, a lower limit for the concentration of the dopant in the window material may be determined at least in part based on an estimated lower limit for the optical absorption coefficient of the window material. In some cases, the lower and upper limits for the optical absorption of the window material can be estimated based on the thickness and the diameter of the lidar window, and desired values of M, M1, M2, or M3 as described above.

In some cases, the optical absorption coefficient of the window material may be adjusted, chosen, or selected such that the attenuation of a beam of light having a wavelength within the operating wavelength range of the optical system and propagating inside the window material is more than 10 dB, 20 dB, 30 dB, 40 dB, 50 dB, or 60 dB larger for a first propagation distance compared to a second propagation distance. In some cases, the optical absorption of the window material may be adjusted, chosen, or selected such that the attenuation of a beam light is attenuated more than 10 dB, 11 dB, 12 dB, 13 dB, 14 dB, 15 dB, 20 dB, 22 dB, 30 dB, 32 dB, 42 dB, 52 dB, 62 dB after propagating a distance equal to the first propagation distance. In some cases, the optical absorption of the window material may be adjusted, chosen, or selected such that the attenuation of a beam light is attenuated less than 1 dB, 1.5 dB, 2 dB, 2.5 dB, 3 dB, or 4 dB after propagating a distance equal to the second propagation distance.

In some cases, the first propagation distance is equal to the attenuation distance and the second propagation distance is equal to the window thickness. In some cases, the first propagation distance is substantially equal to the attenuation distance and the second propagation distance is equal to the window thickness. In some cases, the first propagation distance can be substantially equal to an average circumference of the lidar window. In some cases, the first propagation distance can be longer than the window thickness. In some cases, the first propagation distance can be determined based at least in part on a geometry of the lidar window, a field of view of the detection system of the lidar, a detection threshold of the detection system, and/or a relative position of the entrance aperture of the detection system with respect to the lidar window.

Controlling the Direction of Propagation of Light Guided by the Lidar Window

Figure 5D:
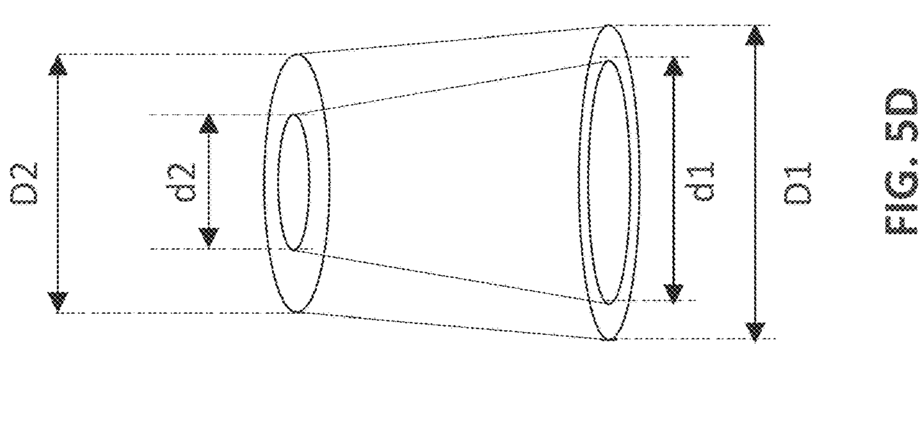
FIG. 5A-5D illustrate perspective views of four different lidar windows having different shapes. Light guided within the thickness of these lidar windows can be directed away from the detection system of a lidar placed at the center of each lidar window.
Figure 5C:
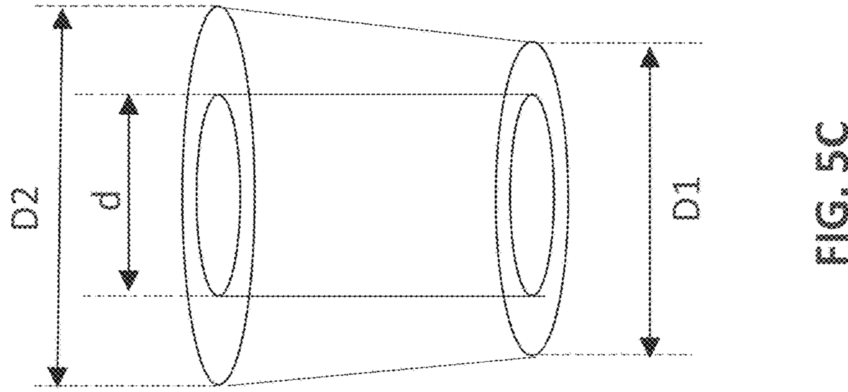
Figure 5B:
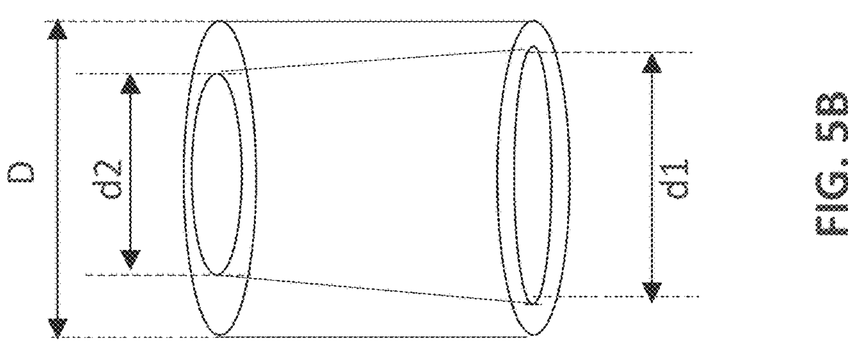
Figure 5A:
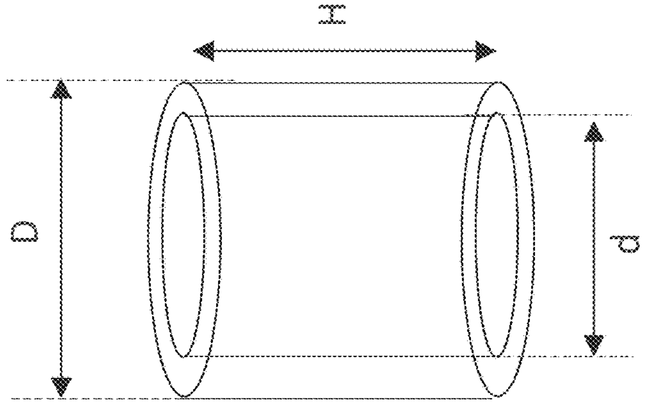

In some cases, a shape of the lidar window may be tailored to reduce the probability of light guided within the thickness of the lidar window to be scattered out of the thickness of the lidar window at a position and in a direction that can be received by the detection system of the lidar. FIG. 5A illustrates a lidar window comprising a cylindrical shell having a height H (normal distance between the base and upper surface of the cylindrical shell), an outer diameter D and an inner diameter d. As shown in FIG. 2A the lidar may be positioned at the center of such cylindrical shell. For example, the rotational axis of the lidar may be parallel or overlap with the axis of the cylindrical shell and a distance between a center of the lidar and the base of the cylindrical shell can be substantially equal to H/2. In various implementations, the shape of the lidar window shown in FIG. 5A may be tailored by changing the thickness of the lidar along its axis (a direction perpendicular to its base). In some cases, the thickness of the window may be changed (e.g., monotonously) along the axis the cylindrical shell. FIG. 5B illustrates a lidar window comprising a cylindrical shell having an outer diameter D that is constant along its axis and an inner diameter that decreases (e.g., monotonously) along its axis from first value (d1) at the base of the cylindrical shell to a second value (d2) at the top surface of the cylindrical shell.

In some cases, the lidar window may comprise a truncated conical shell having a lower diameter, an upper diameter different from the lower diameter, and an inner surface and an outer surface. The lower diameter can be the diameter of the outer surface at the base of the truncated comical shell and the upper diameter can be the diameter of the inner surface at the top of the truncated comical shell. The upper diameter can be larger or smaller than the lower diameter. A diameter of the outer shell may change (e.g., monotonously) from the lower diameter to eth upper diameter. The thickness of the lidar window can be a distance between the inner surface and the outer surfaces of the truncated conical shell along a direction normal to the inner surface and the outer surfaces. In some cases, the thickness of the window may change along the axis of the truncated conical shell. FIG. 5C illustrates a lidar window comprising a truncated conical shell having an inner diameter d that is constant along its axis and an outer diameter that increases (e.g., monotonously) along its axis from a first value or lower diameter (D1) at the base of the truncated conical shell to a second value or the upper diameter (D2) at the top surface of the shell. FIG. 5D illustrates a lidar window comprising a truncated conical shell having an outer diameter that decreases (e.g., monotonously) along its axis from a first value or lower diameter (D1) at the base of the shell to a second value or upper diameter (D2) at the top surface of the shell, and an inner diameter that decreases (e.g., monotonously) along its axis from first value (d1) at the base of the shell to a second value (d2) at the top surface of the shell. It should be understood that the shapes illustrated in FIGS. 5B-5D are examples of possible shapes where the thickness of the cylindrical shell varies along its axis and many other shapes are possible.

In various implementations, when a light beam is incident on a lidar window having a tailored thickness along its axis (e.g., the lidar windows shown in FIGS. 5B-5D), the portion of the incident light that is transformed to an optical beam propagating within the thickness of the lidar window, may be guided in a direction away from the lidar or the detection system of the lidar. For example, instead of propagating along a circular path in plane perpendicular to the axis of cylinder, guided light may propagate along a spiral path toward the base or the top surface of the cylinder. In some cases, a lidar window having a tailored thickness may not permit propagation of guided light in closed path around the perimeter of the lidar window. In such lidar windows, the probability of the guided light to be scattered in the same direction and/or by the same scattering center multiple times during different round trips may be reduced. In some cases, the optical absorption of the lidar windows shown in FIGS. 5B-5D or lidar windows having thicknesses and/or diameters that vary along the axis of the cylindrical shell or the truncated conical shell, may be selected or tailored based on the methods and designs described above with respect to FIGS. 3A, 4A, and 4B.

Example Applications

The above-disclosed lidar windows may be used on lidar devices and systems incorporated into a vehicle as disclosed below. In some aspects and/or embodiments, devices and methods described above may be used in a lidar sensor of an autonomous system included in a vehicle, to improve the autonomous driving capability of the vehicle by reducing the probability of false alarm generation by the lidar sensor (e.g., false alarm associated with indirect light received by the lidar detection system).

Figure 6:
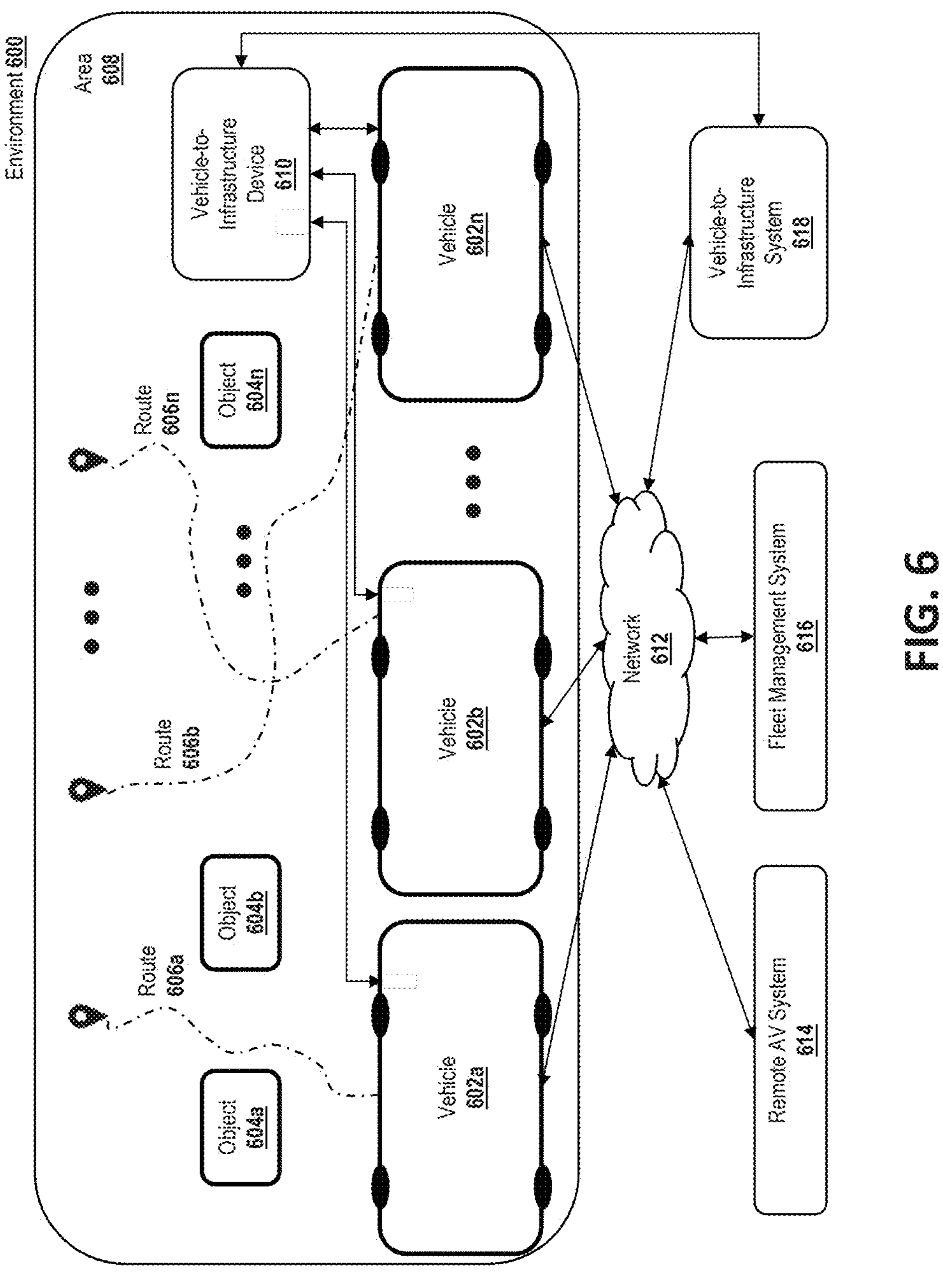
FIG. 6 is an example environment in which a vehicle including one or more components of an autonomous system can be implemented.

Referring now to FIG. 6, illustrated is example environment 600 in which vehicles that include autonomous systems, as well as vehicles that do not, are operated. As illustrated, environment 600 includes vehicles 602*a*-602*n*, objects 604*a*-604*n*, routes 606*a*-606*n*, area 608, vehicle-to-infrastructure (V2I) device 610, network 612, remote autonomous vehicle (AV) system 614, fleet management system 616, and V2I system 618. Vehicles 602*a*-602*n*, vehicle-to-infrastructure (V2I) device 610, network 612, autonomous vehicle (AV) system 614, fleet management system 616, and V2I system 618 interconnect (e.g., establish a connection to communicate and/or the like) via wired connections, wireless connections, or a combination of wired or wireless connections. In some embodiments, objects 604*a*-604*n* interconnect with at least one of vehicles 602*a*-602*n*, vehicle-to-infrastructure (V2I) device 610, network 612, autonomous vehicle (AV) system 614, fleet management system 616, and V2I system 618 via wired connections, wireless connections, or a combination of wired or wireless connections.

Vehicles 602*a*-602*n* (referred to individually as vehicle 602 and collectively as vehicles 602) include at least one device configured to transport goods and/or people. In some embodiments, vehicles 602 are configured to be in communication with V2I device 610, remote AV system 614, fleet management system 616, and/or V2I system 618 via network 612. In some embodiments, vehicles 602 include cars, buses, trucks, trains, and/or the like. In some embodiments, vehicles 602 are the same as, or similar to, vehicles 700, described herein (see FIG. 7). In some embodiments, a vehicle 700 of a set of vehicles 700 is associated with an autonomous fleet manager. In some embodiments, vehicles 602 travel along respective routes 606*a*-606*n* (referred to individually as route 606 and collectively as routes 606), as described herein. In some embodiments, one or more vehicles 602 include an autonomous system (e.g., an autonomous system that is the same as or similar to autonomous system 702).

Objects 604*a*-604*n* (referred to individually as object 604 and collectively as objects 604) include, for example, at least one vehicle, at least one pedestrian, at least one cyclist, at least one structure (e.g., a building, a sign, a fire hydrant, etc.), and/or the like. Each object 604 is stationary (e.g., located at a fixed location for a period of time) or mobile (e.g., having a velocity and associated with at least one trajectory). In some embodiments, objects 604 are associated with corresponding locations in area 608.

Routes 606*a*-606*n* (referred to individually as route 606 and collectively as routes 606) are each associated with (e.g., prescribe) a sequence of actions (also known as a trajectory) connecting states along which an AV can navigate. Each route 606 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 606 include a plurality of acceptable state sequences (e.g., a plurality of spatiotemporal location sequences), the plurality of state sequences associated with (e.g., defining) a plurality of trajectories. In an example, routes 606 include only high level actions or imprecise state locations, such as a series of connected roads dictating turning directions at roadway intersections. Additionally, or alternatively, routes 606 may include more precise actions or states such as, for example, specific target lanes or precise locations within the lane areas and targeted speed at those positions. In an example, routes 606 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 608 includes a physical area (e.g., a geographic region) within which vehicles 602 can navigate. In an example, area 608 includes at least one state (e.g., a country, a province, an individual state of a plurality of states included in a country, etc.), at least one portion of a state, at least one city, at least one portion of a city, etc. In some embodiments, area 608 includes at least one named thoroughfare (referred to herein as a "road") such as a highway, an interstate highway, a parkway, a city street, etc. Additionally, or alternatively, in some examples area 608 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 602). In an example, a road includes at least one lane associated with (e.g., identified based on) at least one lane marking.

Vehicle-to-Infrastructure (V2I) device 610 (sometimes referred to as a Vehicle-to-Infrastructure or Vehicle-to-Everything (V2X) device) includes at least one device configured to be in communication with vehicles 602 and/or V2I infrastructure system 618. In some embodiments, V2I device 610 is configured to be in communication with vehicles 602, remote AV system 614, fleet management system 616, and/or V2I system 618 via network 612. In some embodiments, V2I device 610 includes a radio frequency identification (RFID) device, signage, cameras (e.g., two-dimensional (2D) and/or three-dimensional (3D) cameras), lane markers, streetlights, parking meters, etc. In some embodiments, V2I device 610 is configured to communicate directly with vehicles 602. Additionally, or alternatively, in some embodiments V2I device 610 is configured to communicate with vehicles 602, remote AV system 614, and/or fleet management system 616 via V2I system 618. In some embodiments, V2I device 610 is configured to communicate with V2I system 618 via network 612.

Network 612 includes one or more wired and/or wireless networks. In an example, network 612 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 614 includes at least one device configured to be in communication with vehicles 602, V2I device 610, network 612, fleet management system 616, and/or V2I system 618 via network 612. In an example, remote AV system 614 includes a server, a group of servers, and/or other like devices. In some embodiments, remote AV system 614 is co-located with the fleet management system 616. In some embodiments, remote AV system 614 is involved in the installation of some or all of the components of a vehicle, including an autonomous system, an autonomous vehicle compute, software implemented by an autonomous vehicle compute, and/or the like. In some embodiments, remote AV system 614 maintains (e.g., updates and/or replaces) such components and/or software during the lifetime of the vehicle.

Fleet management system 616 includes at least one device configured to be in communication with vehicles 602, V2I device 610, remote AV system 614, and/or V2I infrastructure system 618. In an example, fleet management system 616 includes a server, a group of servers, and/or other like devices. In some embodiments, fleet management system 616 is associated with a ridesharing company (e.g., an organization that controls operation of multiple vehicles (e.g., vehicles that include autonomous systems and/or vehicles that do not include autonomous systems) and/or the like).

In some embodiments, V2I system 618 includes at least one device configured to be in communication with vehicles 602, V2I device 610, remote AV system 614, and/or fleet management system 616 via network 612. In some examples, V2I system 618 is configured to be in communication with V2I device 610 via a connection different from network 612. In some embodiments, V2I system 618 includes a server, a group of servers, and/or other like devices. In some embodiments, V2I system 618 is associated with a municipality or a private institution (e.g., a private institution that maintains V2I device 610 and/or the like).

The number and arrangement of elements illustrated in FIG. 6 are provided as an example. There can be additional elements, fewer elements, different elements, and/or differently arranged elements, than those illustrated in FIG. 6. Additionally, or alternatively, at least one element of environment 600 can perform one or more functions described as being performed by at least one different element of FIG. 6. Additionally, or alternatively, at least one set of elements of environment 600 can perform one or more functions described as being performed by at least one different set of elements of environment 600.

Figure 7:
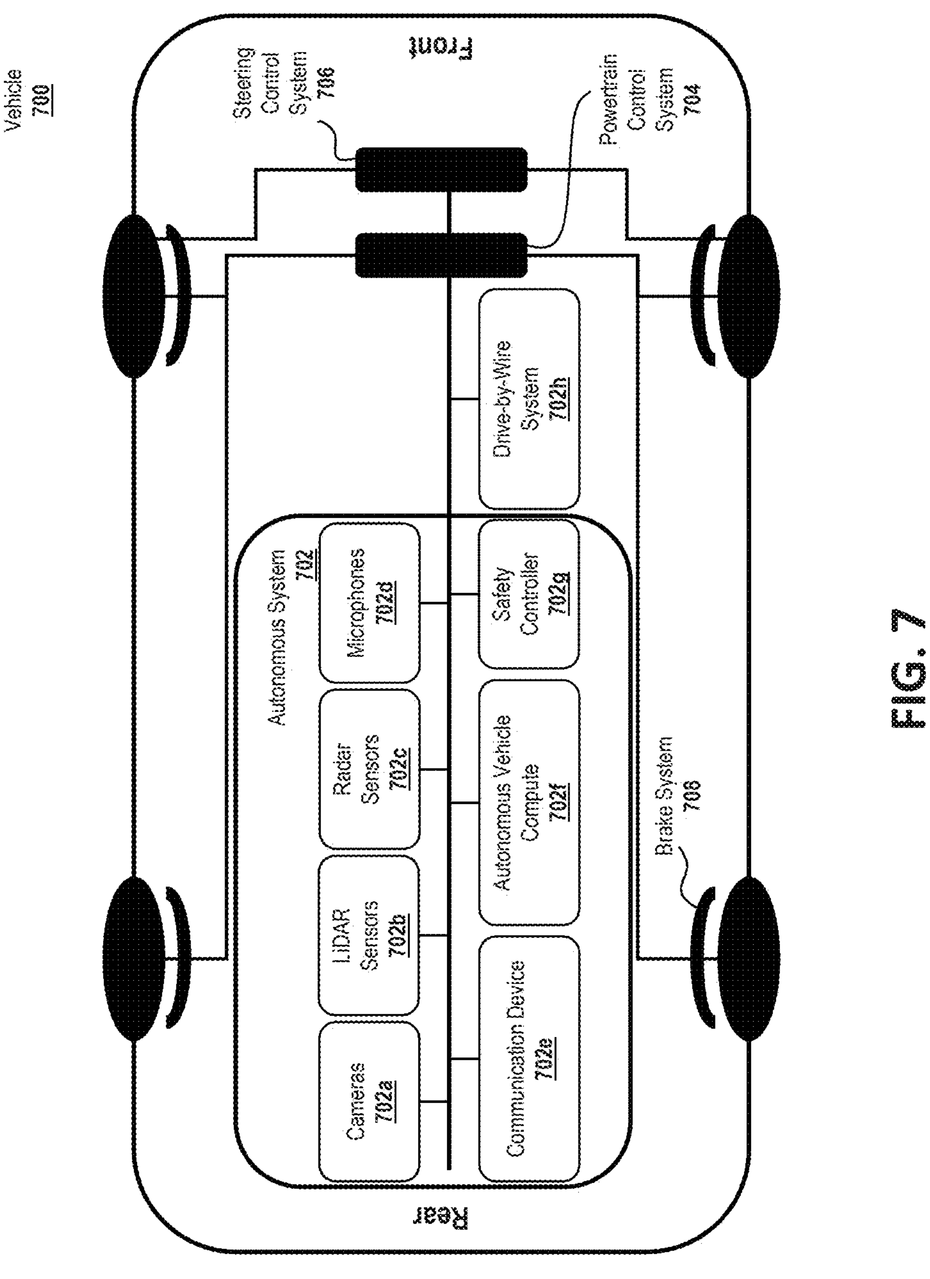
FIG. 7 is a diagram of one or more systems of a vehicle including an autonomous system.

Referring now to FIG. 7, vehicle 700 (which may be the same as, or similar to vehicles 602 of FIG. 6) includes or is associated with autonomous system 702, powertrain control system 704, steering control system 706, and brake system 708. In some embodiments, vehicle 700 is the same as or similar to vehicle 602 (see FIG. 6). In some embodiments, autonomous system 702 is configured to confer vehicle 700 autonomous driving capability (e.g., implement at least one driving automation or maneuver-based function, feature, device, and/or the like that enable vehicle 700 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 702 includes operational or tactical functionality required to operate vehicle 700 in on-road traffic and perform part or all of Dynamic Driving Task (DDT) on a sustained basis. In another embodiment, autonomous system 702 includes an Advanced Driver Assistance System (ADAS) that includes driver support features. Autonomous system 702 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 700 is associated with an autonomous fleet manager and/or a ridesharing company.

Autonomous system 702 includes a sensor suite that includes one or more devices such as cameras **702*a*, LiDAR sensors 702*b*, radar sensors 702*c*, and microphones 702*d*. In some embodiments, autonomous system 702 can include more or fewer devices and/or different devices (e.g., ultrasonic sensors, inertial sensors, GPS receivers (discussed below), odometry sensors that generate data associated with an indication of a distance that vehicle 700 has traveled, and/or the like). In some embodiments, autonomous system 702 uses the one or more devices included in autonomous system 702 to generate data associated with environment 600, described herein. The data generated by the one or more devices of autonomous system 702 can be used by one or more systems described herein to observe the environment (e.g., environment 600) in which vehicle 700 is located. In some embodiments, autonomous system 702 includes communication device 702*e*, autonomous vehicle compute 702*f*, drive-by-wire (DBW) system 702*h*, and safety controller 702*g***.

In some cases, at least the LiDAR sensors **702*b***, may have a lidar window comprising one or more features described above with respect to reducing the intensity of light indirectly received by the corresponding lidar detection system via optical guiding within the thickness of the lidar window.

Figure 8:
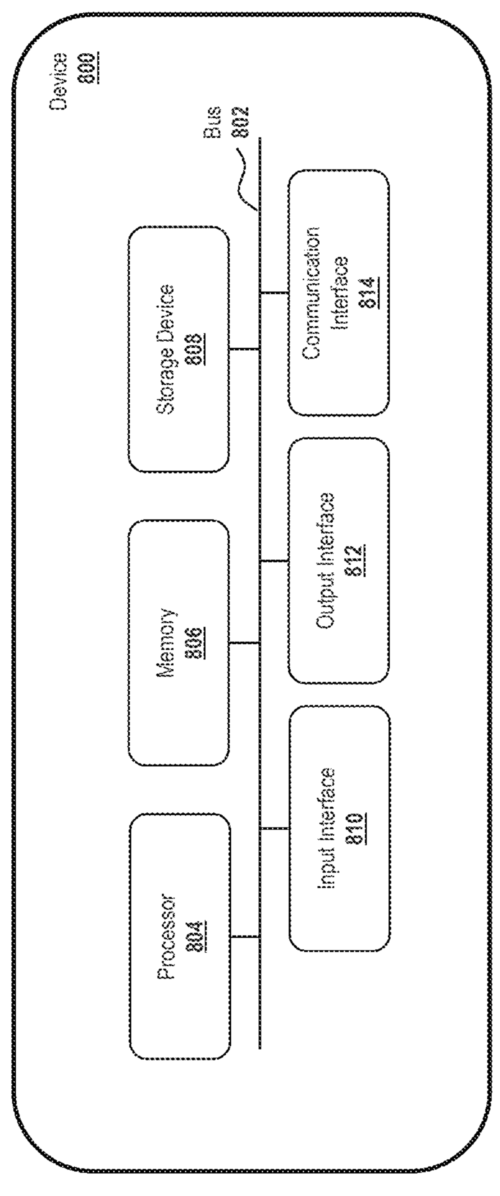
FIG. 8 is a diagram of components of one or more devices and/or one or more systems of FIGS. 6 and 7.

Cameras 702*a* include at least one device configured to be in communication with communication device 702*e*, autonomous vehicle compute 702*f*, and/or safety controller 702*g* via a bus (e.g., a bus that is the same as or similar to bus 802 of FIG. 8). Cameras 702*a* include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 702*a* generates camera data as output. In some examples, camera 702*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 702*a* includes a plurality of independent cameras configured on (e.g., positioned on) a vehicle to capture images for the purpose of stereopsis (stereo vision). In some examples, camera 702*a* includes a plurality of cameras that generate image data and transmit the image data to autonomous vehicle compute 702*f* and/or a fleet management system (e.g., a fleet management system that is the same as or similar to fleet management system 616 of FIG. 6). In such an example, autonomous vehicle compute 702*f* determines depth to one or more objects in a field of view of at least two cameras of the plurality of cameras based on the image data from the at least two cameras. In some embodiments, cameras 702*a* is configured to capture images of objects within a distance from cameras 702*a* (e.g., up to 600 meters, up to a kilometer, and/or the like). Accordingly, cameras 702*a* include features such as sensors and lenses that are optimized for perceiving objects that are at one or more distances from cameras 702*a*.

In an embodiment, camera 702*a* includes at least one camera configured to capture one or more images associated with one or more traffic lights, street signs and/or other physical objects that provide visual navigation information. In some embodiments, camera 702*a* generates traffic light data associated with one or more images. In some examples, camera 702*a* generates TLD (Traffic Light Detection) data associated with one or more images that include a format (e.g., RAW, JPEG, PNG, and/or the like). In some embodiments, camera 702*a* that generates TLD data differs from other systems described herein incorporating cameras in that camera 702*a* can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 702*b* include at least one device configured to be in communication with communication device 702*e*, autonomous vehicle compute 702*f*, and/or safety controller 702*g* via a bus (e.g., a bus that is the same as or similar to bus 802 of FIG. 8). LiDAR sensors 702*b* include a system configured to transmit light from a light emitter (e.g., a laser transmitter). Light emitted by LiDAR sensors 702*b* include light (e.g., infrared light and/or the like) that is outside of the visible spectrum. In some embodiments, during operation, light emitted by LiDAR sensors 702*b* encounters a physical object (e.g., a vehicle) and is reflected back to LiDAR sensors 702*b*. In some embodiments, the light emitted by LiDAR sensors 702*b* does not penetrate the physical objects that the light encounters. LiDAR sensors 702*b* also include at least one light detector, which detects the light that was emitted from the light emitter after the light encounters a physical object. In some embodiments, at least one data processing system associated with LiDAR sensors 702*b* generates an image (e.g., a point cloud, a combined point cloud, and/or the like) representing the objects included in a field of view of LiDAR sensors 702*b*. In some examples, the at least one data processing system associated with LiDAR sensor 702*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 702*b*.

Radio Detection and Ranging (radar) sensors 702*c* include at least one device configured to be in communication with communication device 702*e*, autonomous vehicle compute 702*f*, and/or safety controller 702*g* via a bus (e.g., a bus that is the same as or similar to bus 802 of FIG. 8). Radar sensors 702*c* include a system configured to transmit radio waves (either pulsed or continuously). The radio waves transmitted by radar sensors 702*c* include radio waves that are within a predetermined spectrum In some embodiments, during operation, radio waves transmitted by radar sensors 702*c* encounter a physical object and are reflected back to radar sensors 702*c*. In some embodiments, the radio waves transmitted by radar sensors 702*c* are not reflected by some objects. In some embodiments, at least one data processing system associated with radar sensors 702*c* generates signals representing the objects included in a field of view of radar sensors 702*c*. For example, the at least one data processing system associated with radar sensor 702*c* generates an image that represents the boundaries of a physical object, the surfaces (e.g., the topology of the surfaces) of the physical object, and/or the like. In some examples, the image is used to determine the boundaries of physical objects in the field of view of radar sensors 702*c*.

Microphones 702*d* includes at least one device configured to be in communication with communication device 702*e*, autonomous vehicle compute 702*f*, and/or safety controller 702*g* via a bus (e.g., a bus that is the same as or similar to bus 802 of FIG. 8). Microphones 702*d* include one or more microphones (e.g., array microphones, external microphones, and/or the like) that capture audio signals and generate data associated with (e.g., representing) the audio signals. In some examples, microphones 702*d* include transducer devices and/or like devices. In some embodiments, one or more systems described herein can receive the data generated by microphones 702*d* and determine a position of an object relative to vehicle 700 (e.g., a distance and/or the like) based on the audio signals associated with the data.

Communication device 702*e* includes at least one device configured to be in communication with cameras 702*a*, LiDAR sensors 702*b*, radar sensors 702*c*, microphones 702*d*, autonomous vehicle compute 702*f*, safety controller 702*g*, and/or DBW (Drive-By-Wire) system 702*h*. For example, communication device 702*e* may include a device that is the same as or similar to communication interface 814 of FIG. 8. In some embodiments, communication device 702*e* includes a vehicle-to-vehicle (V2V) communication device (e.g., a device that enables wireless communication of data between vehicles).

Autonomous vehicle compute 702*f* include at least one device configured to be in communication with cameras 702*a*, LiDAR sensors 702*b*, radar sensors 702*c*, microphones 702*d*, communication device 702*e*, safety controller 702*g*, and/or DBW system 702*h*. In some examples, autonomous vehicle compute 702*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 702f is the same as or similar to autonomous vehicle compute 400, described herein. Additionally, or alternatively, in some embodiments autonomous vehicle compute 702f is configured to be in communication with an autonomous vehicle system (e.g., an autonomous vehicle system that is the same as or similar to remote AV system 614 of FIG. 6), a fleet management system (e.g., a fleet management system that is the same as or similar to fleet management system 616 of FIG. 6), a V2I device (e.g., a V2I device that is the same as or similar to V2I device 610 of FIG. 6), and/or a V2I system (e.g., a V2I system that is the same as or similar to V2I system 618 of FIG. 6).

Safety controller 702g includes at least one device configured to be in communication with cameras 702a, LiDAR sensors 702b, radar sensors 702c, microphones 702d, communication device 702e, autonomous vehicle computer 702f, and/or DBW system 702h. In some examples, safety controller 702g includes one or more controllers (electrical controllers, electromechanical controllers, and/or the like) that are configured to generate and/or transmit control signals to operate one or more devices of vehicle 700 (e.g., powertrain control system 704, steering control system 706, brake system 708, and/or the like). In some embodiments, safety controller 702g is configured to generate control signals that take precedence over (e.g., overrides) control signals generated and/or transmitted by autonomous vehicle compute 702f.

DBW system 702h includes at least one device configured to be in communication with communication device 702e and/or autonomous vehicle compute 702f. In some examples, DBW system 702h includes one or more controllers (e.g., electrical controllers, electromechanical controllers, and/or the like) that are configured to generate and/or transmit control signals to operate one or more devices of vehicle 700 (e.g., powertrain control system 704, steering control system 706, brake system 708, and/or the like). Additionally, or alternatively, the one or more controllers of DBW system 702h are configured to generate and/or transmit control signals to operate at least one different device (e.g., a turn signal, headlights, door locks, windshield wipers, and/or the like) of vehicle 700.

Powertrain control system 704 includes at least one device configured to be in communication with DBW system 702h. In some examples, powertrain control system 704 includes at least one controller, actuator, and/or the like. In some embodiments, powertrain control system 704 receives control signals from DBW system 702h and powertrain control system 704 causes vehicle 700 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 704 causes the energy (e.g., fuel, electricity, and/or the like) provided to a motor of the vehicle to increase, remain the same, or decrease, thereby causing at least one wheel of vehicle 700 to rotate or not rotate.

Steering control system 706 includes at least one device configured to rotate one or more wheels of vehicle 700. In some examples, steering control system 706 includes at least one controller, actuator, and/or the like. In some embodiments, steering control system 706 causes the front two wheels and/or the rear two wheels of vehicle 700 to rotate to the left or right to cause vehicle 700 to turn to the left or right. In other words, steering control system 706 causes activities necessary for the regulation of the y-axis component of vehicle motion.

Brake system 708 includes at least one device configured to actuate one or more brakes to cause vehicle 700 to reduce speed and/or remain stationary. In some examples, brake system 708 includes at least one controller and/or actuator that is configured to cause one or more calipers associated with one or more wheels of vehicle 700 to close on a corresponding rotor of vehicle 700. Additionally, or alternatively, in some examples brake system 708 includes an automatic emergency braking (AEB) system, a regenerative braking system, and/or the like.

In some embodiments, vehicle 700 includes at least one platform sensor (not explicitly illustrated) that measures or infers properties of a state or a condition of vehicle 700. In some examples, vehicle 700 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 708 is illustrated to be located in the near side of vehicle 700 in FIG. 7, brake system 708 may be located anywhere in vehicle 700.

Referring now to FIG. 8, illustrated is a schematic diagram of a device 800. As illustrated, device 800 includes processor 804, memory 806, storage component 808, input interface 810, output interface 812, communication interface 814, and bus 802. In some embodiments, device 800 corresponds to at least one device of vehicles 602a-602n, at least one device of vehicle 700, and/or one or more devices of network 612. In some embodiments, one or more devices of vehicles 602a-602n, and/or one or more devices of network 612 include at least one device 800 and/or at least one component of device 800. As shown in FIG. 8, device 800 includes bus 802, processor 804, memory 806, storage component 808, input interface 810, output interface 812, and communication interface 814.

Bus 802 includes a component that permits communication among the components of device 800. In some cases, the processor 804 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 806 includes random access memory (RAM), read-only memory (ROM), and/or another type of dynamic and/or static storage device (e.g., flash memory, magnetic memory, optical memory, and/or the like) that stores data and/or instructions for use by processor 804.

Storage component 808 stores data and/or software related to the operation and use of device 800. In some examples, storage component 808 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 810 includes a component that permits device 800 to receive information, such as via user input (e.g., a touchscreen display, a keyboard, a keypad, a mouse, a button, a switch, a microphone, a camera, and/or the like). Additionally or alternatively, in some embodiments input interface 810 includes a sensor that senses information (e.g., a global positioning system (GPS) receiver, an accelerometer, a gyroscope, an actuator, and/or the like). Output interface 812 includes a component that provides output information from device 800 (e.g., a display, a speaker, one or more light-emitting diodes (LEDs), and/or the like).

In some embodiments, communication interface 814 includes a transceiver-like component (e.g., a transceiver, a separate receiver and transmitter, and/or the like) that permits device 800 to communicate with other devices via a wired connection, a wireless connection, or a combination of wired and wireless connections. In some examples, communication interface 814 permits device 800 to receive information from another device and/or provide information to another device. In some examples, communication interface 814 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 800 performs one or more processes described herein. Device 800 performs these processes based on processor 804 executing software instructions stored by a computer-readable medium, such as memory 305 and/or storage component 808. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 806 and/or storage component 808 from another computer-readable medium or from another device via communication interface 814. When executed, software instructions stored in memory 806 and/or storage component 808 cause processor 804 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 806 and/or storage component 808 includes data storage or at least one data structure (e.g., a database and/or the like). Device 800 is capable of receiving information from, storing information in, communicating information to, or searching information stored in the data storage or the at least one data structure in memory 806 or storage component 808. In some examples, the information includes network data, input data, output data, or any combination thereof.

In some embodiments, device 800 is configured to execute software instructions that are either stored in memory 806 and/or in the memory of another device (e.g., another device that is the same as or similar to device 800). As used herein, the term "module" refers to at least one instruction stored in memory 806 and/or in the memory of another device that, when executed by processor 804 and/or by a processor of another device (e.g., another device that is the same as or similar to device 800) cause device 800 (e.g., at least one component of device 800) to perform one or more processes described herein. In some embodiments, a module is implemented in software, firmware, hardware, and/or the like.

The number and arrangement of components illustrated in FIG. 8 are provided as an example. In some embodiments, device 800 can include additional components, fewer components, different components, or differently arranged components than those illustrated in FIG. 8. Additionally or alternatively, a set of components (e.g., one or more components) of device 800 can perform one or more functions described as being performed by another component or another set of components of device 800.

Figure 9:
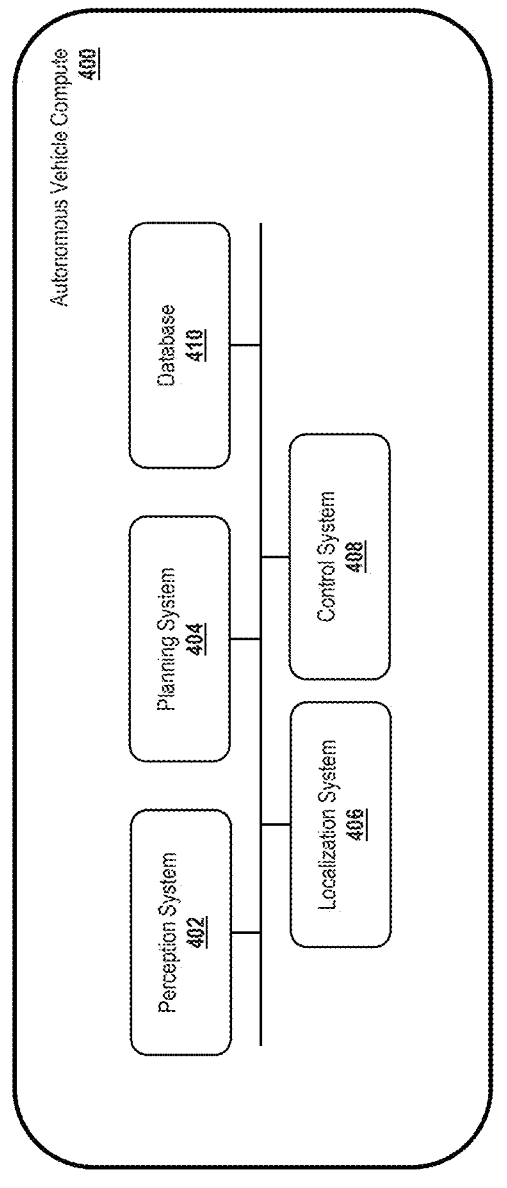
FIG. 9 is a diagram of certain components of an autonomous system.

Referring now to FIG. 9, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute **702*f* of vehicle 700). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 614, a fleet management system 616 that is the same as or similar to fleet management system 616, a V2I system that is the same as or similar to V2I system 618**, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras **702*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402** classifying the physical objects.

In some embodiments, planning system 404 receives data associated with a destination and generates data associated with at least one route (e.g., routes 606) along which a vehicle (e.g., vehicles 602) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 602 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 602) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 602) in an area. In some examples, localization system 406 receives LiDAR data associated with at least one point cloud generated by at least one LiDAR sensor (e.g., LiDAR sensors 702*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 702*h*, powertrain control system 704, and/or the like), a steering control system (e.g., steering control system 706), and/or a brake system (e.g., brake system 708) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 706 to adjust a steering angle of vehicle 700, thereby causing vehicle 700 to turn left. Additionally, or alternatively, control system 408 generates and transmits control signals to cause other devices (e.g., headlights, turn signal, door locks, windshield wipers, and/or the like) of vehicle 700 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). Database 410 stores data that is transmitted to, received from, and/or updated by perception system 402, planning system 404, localization system 406 and/or control system 408. In some examples, database 410 includes a storage component (e.g., a storage component that is the same as or similar to storage component 808 of FIG. 8) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 602 and/or vehicle 700) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 702*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 602 and/or vehicle 700), an autonomous vehicle system (e.g., an autonomous vehicle system that is the same as or similar to remote AV system 614, a fleet management system (e.g., a fleet management system that is the same as or similar to fleet management system 616 of FIG. 6, a V2I system (e.g., a V2I system that is the same as or similar to V2I system 618 of FIG. 6) and/or the like.

Example Embodiments

Some additional nonlimiting examples of embodiments discussed above are provided below. These should not be read as limiting the breadth of the disclosure in any way.

Example 1. A system, comprising:

an optical system configured to emit optical probe beams to an environment and receive reflections of the optical probe beams from the environment, wherein a wavelength of the optical probe beams is within an operating wavelength range of the optical system, and the reflections of optical probe beams are detected by a detection system of the optical system; and a lidar window having a window diameter and a window thickness, the lidar window surrounding the optical system such that the optical probe beams are transmitted from the optical system to the environment and the reflections of the optical probe beams are received by detection system from the environment, through the lidar window;

wherein the lidar window comprises a window material having an optical absorption coefficient, wherein the optical absorption coefficient is configured such that an attenuation of a beam of light, having a wavelength within the operating wavelength range of the optical system, is more than 10 times larger for a first propagation distance compared to a second propagation distance, when the beam of light propagates inside the window material; and wherein the first propagation distance is determined based at least in part on the window diameter and the second propagation distance is equal to the window thickness.

Example 2. The system of Example 1, wherein the lidar window comprises a cylindrical shell having an inner surface and an outer surface, wherein the window thickness is a distance between the inner surface and the outer surface along a direction normal to the inner surface and the outer surface, and wherein the window diameter is a diameter of the outer surface.

Example 3. The system of any of Examples 1 or 2 wherein the optical absorption coefficient is further configured such that the beam of light is attenuated more than 11 dB after propagating a distance equal to the first propagation distance.

Example 4. The system of any of Examples 1-3 wherein the optical absorption coefficient is further configured such that the beam of light is attenuated less than 1 dB after propagating a distance equal to the second propagation distance.

Example 5. The system of any of Examples 1-4, wherein the window thickness is less than 5 mm.

Example 6. The system of any of Examples 1-5 wherein the first propagation distance is larger than 30 cm.

Example 7. The system of any of Examples 1-6, wherein the window diameter is larger than 50 mm.

Example 8. The system of any of Examples 2-7, wherein the lidar window surrounds the optical system such that the optical probe beams emitted by the optical system are incident on the inner surface of the cylindrical shell and the reflections of the optical probe beams received from the environment are incident on the outer surface of the cylindrical shell.

Example 9. The system of any of Examples 2-8 wherein the first propagation distance is equal to an average circumference of the cylindrical shell.

Example 10. The system of any of Examples 2-8 wherein the first propagation distance is shorter than outer circumference of the cylindrical shell and longer than the window thickness.

Example 11. The system of any of Examples 2-10, wherein a portion of an optical beam received from the environment and incident on the lidar window at a first position on a perimeter of the lidar window propagates within a thickness of the cylindrical shell along an optical path bound by the inner surface and the outer surface, is scattered out of the thickness of the cylindrical shell at a second position different than the first position on the perimeter of the lidar window, and is received by detection system.

Example 12. The system of any of Examples 11-7 wherein the optical beam incident on the lidar window comprises a reflected optical beam associated with an optical probe beam emitted by the optical system or a scattered optical beam associated with the optical probe beam emitted by the optical system.

Example 13. The system of Example 12 wherein the scattered or the reflected optical beams are associated with interaction of the optical probe beam with an object in the environment located within a near-field range of the optical system.

Example 14. The system of any of Examples 11-13 wherein an intensity of the portion of the optical beam incident on the lidar window that is received by the detection system is below a detection threshold of the detection system.

Example 15. The system of any of Examples 11-14 wherein the first propagation distance is equal to a length of the optical path form the first position to the second position.

Example 16. The system of any of Examples 1-15 wherein the detection system has a field of view, and the first propagation distance is determined based at least in part on the field of view of the detection system.

Example 17. The system of any of Examples 1-16, wherein the window material comprises a doped material comprising a dopant.

Example 18. The system of Example 17, wherein the dopant has an absorption line that overlaps at least partially with the wavelength of the optical probe beams.

Example 19. The system of Example 17, wherein the optical absorption coefficient of the window material is associated with the concentration of the dopant in the window material.

Example 20. The system of Example 17, wherein the doped material comprises glass.

Example 21. The system of Example 17, wherein the doped material comprises polycarbonate.

Example 22. The system of any of Examples 2-21, wherein the window thickness varies along the axis of the cylindrical shell.

Example 23. The system of Example 1, wherein lidar window comprises a truncated conical shell having:

an inner surface and an outer surface, a lower diameter and an upper diameter different from the lower diameter;

wherein the lower diameter and the upper diameters comprise different diameters of the outer surface; and wherein the window thickness is a distance between the inner surface and the outer surface along a direction normal to the inner surface and the outer surface.

Example 24. The system of Example 23, wherein the lower diameter is smaller than the upper diameter.

Example 25. The system of Example 23, wherein the lower diameter is larger than the upper diameter.

Example 26. The system of any of Examples 23-25, wherein the window thickness varies along the axis of the truncated conical shell.

Example 27. The system of any of Examples 23-26, wherein at least a portion of an optical beam received from the environment and incident on the lidar window at a first position on a perimeter of the lidar window propagates within a thickness of the cylindrical shell along an optical path bound by the inner surface and the outer surface, is directed to exit the thickness of the truncated conical shell at a second position different than the first position on the perimeter of the lidar window, along a direction away from a field of view of detection system.

Example 28. A method of reducing of false signals in an optical system configured to emit optical probe beams to an environment and receive reflections of the optical probe beams from the environment, wherein a wavelength of the optical probe beams is within an operating wavelength range of the optical system, and the reflections of optical probe beams are detected by a detection system of the optical system, the method comprising:

selecting a window material;

forming a lidar window having a window diameter and a window thickness using the selected window material, wherein the lidar window surrounds the optical system such that the optical probe beams are transmitted from the optical system to the environment and the reflections of the optical probe beams are received by detection system from the environment, through the lidar window;

wherein selecting the window material comprises selecting an absorption coefficient of the window material such that attenuation of a beam of light, having a wavelength within the operating wavelength range of the optical system, is more than 10 times larger for a first propagation distance compared to a second propagation distance, when the beam of light propagates inside the window material; and wherein the first propagation distance is determined based at least in part on the window diameter and the second propagation distance is equal to the window thickness.

Example 29. The method of Example 28, wherein the lidar window comprises a cylindrical shell having an inner surface and an outer surface, wherein the window thickness is a distance between the inner surface and the outer surface along a direction normal to the inner surface and the outer surface, and wherein the window diameter is a diameter of the outer surface.

Example 30. The method of any of Examples 28-29, wherein selecting the window material further comprises selecting a window material having an absorption coefficient such that the beam of light is attenuated more than 11 dB after propagating a distance equal to the first propagation distance.

Example 31. The method of any of Examples 28-30, wherein selecting the window material further comprises selecting a window material having an absorption coefficient such that the beam of light is attenuated more less than 1 dB after propagating a distance equal to the second propagation distance.

Example 32. The method of any of Examples 28-31, wherein the window thickness is less than 5 mm.

Example 33. The method of any of Examples 28-32, wherein the first propagation distance is larger than 30 cm.

Example 34. The method of any of Examples 28-33, wherein the lidar window diameter is larger than 50 mm.

Example 35. The method of any of Examples 29-34, wherein the lidar window surrounds the optical system such that the optical probe beams emitted by the optical system are incident on the inner surface of the cylindrical shell and the reflections of the optical probe beams received from the environment are incident on the outer surface of the cylindrical shell.

Example 36. The method of any of Examples 29-35, wherein the first propagation distance is equal to an average circumference of the cylindrical shell.

Example 37. The method of any of Examples 29-35, wherein the first propagation distance is shorter than outer circumference of the cylindrical shell and longer than the window thickness.

Example 38. The method of any of Examples 29-37, wherein a portion of an optical beam received from the environment and incident on the lidar window at a first position on a perimeter of the lidar window propagates within a thickness of the cylindrical shell along an optical path bound by the inner surface and the outer surface, is scattered out of the thickness of the cylindrical shell at a second position different than the first position on the perimeter of the lidar window, and is received by detection system.

Example 39. The method of Example 38, wherein the optical beam incident on the lidar window comprises a reflected optical beam associated with an optical probe beam emitted by the optical system or a scattered optical beam associated with the optical probe beam emitted by the optical system.

Example 40. The method of Example 39, wherein the scattered or the reflected optical beams are associated with interaction of the optical probe beam with an object in the environment located within a near-field range of the optical system.

Example 41. The method of any of Examples 38-40, wherein intensity of the portion of the optical beam incident on the lidar window that is received by the detection system is below a detection threshold of the detection system.

Example 42. The method of any of Examples 38-41, wherein the first propagation distance is equal to a length of the optical path form the first position to the second position.

Example 43. The method of any of Examples 28-42, wherein the detection system has a field of view, and the first propagation distance is determined based at least in part on the field of view of the detection system.

Example 44. The method of any of Examples 28-43, wherein the window material comprises a doped material comprising a dopant.

Example 45. The method of Example 44, wherein the dopant has an absorption line that overlaps at least partially with the wavelength of the optical probe beams.

Example 46. The method of Example 44, wherein concentration of the dopant in the window material is determined based at least in part on the optical absorption coefficient selected for the window material.

Example 47. The method of Example 44, wherein the doped material comprises glass.

Example 48. The method of Example 44, wherein the doped material comprises polycarbonate.

Example 49. The method of any of Examples 29-18, wherein the window thickness varies along the axis of the cylindrical shell.

Example 50. The method of Examples 28, wherein lidar window comprises a truncated conical shell having:

an inner surface and an outer surface, a lower diameter and an upper diameter different from the lower diameter;

wherein the lower diameter and the upper diameter comprise different diameters of the outer surface; and wherein the window thickness is a distance between the inner surface and the outer surface along a direction normal to the inner surface and the outer surface.

Example 51. The method of Example 50, wherein the lower diameter is smaller than the upper diameter.

Example 52. The method of Example 50, wherein the lower diameter is larger than the upper diameter.

Example 53. The method of any of Examples 50-52, wherein the window thickness varies along the axis of the truncated conical shell.

Example 54. The method of any of Examples 50-53, wherein at least a portion of an optical beam received from the environment and incident on the lidar window at a first position on a perimeter of the lidar window propagates within a thickness of the cylindrical shell along an optical path bound by the inner surface and the outer surface, is directed to exit the thickness of the truncated conical shell at a second position different than the first position on the perimeter of the lidar window, along a direction away from a field of view of detection system.

Terminology

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

What is claimed is:

1. A system, comprising:

an optical system comprising:

an emitter configured to emit an optical probe beam to an environment, and a detector configured to detect a first portion of a reflection of the optical probe beam from the environment and a second portion of the reflection of the optical probe beam, wherein a wavelength of the optical probe beam is within an operating wavelength range of the optical system; and a lidar window having a window thickness, the lidar window surrounding the optical system such that the optical probe beam is transmitted from the emitter to the environment through the lidar window and the first portion of the reflection of the optical probe beam and the second portion of reflection of the optical probe beam are received by the detector from the environment through the lidar window, wherein the lidar window comprises a window material having an optical absorption coefficient configured to attenuate the first portion of the reflection of the optical probe beam at least ten times more than the second portion of the reflection of the optical probe beam, wherein the first portion of the reflection of the optical probe beam is attenuated via a first optical path having a first propagation distance and the second portion of the reflection of the optical probe beam is attenuated via a second optical path having a second propagation distance, wherein the first optical path comprises multiple reflections between an inner surface of the lidar window and an outer surface of the lidar window, and wherein the second propagation distance is substantially equal to the window thickness.

2. The system of claim 1, wherein the lidar window comprises a cylindrical shell, wherein the window thickness is a distance between the inner surface and the outer surface along a direction normal to the inner surface and the outer surface.

3. The system of claim 1 wherein the optical absorption coefficient is further configured such that the first portion of the reflection of the optical probe beam is attenuated at least 11 dB along the first optical path.

4. The system of claim 1 wherein the optical absorption coefficient is further configured such that the second portion of the reflection of the optical probe beam is attenuated less than or equal to 1 dB along the second propagation distance.

5. The system of claim 1 wherein a length of the first optical path is equal to an average circumference of the lidar window.

6. The system of claim 1 wherein a length of the first optical path is less than an outer circumference of the lidar window and greater than the window thickness.

7. The system of claim 1, wherein the first portion of the reflection of the optical probe beam comprises a portion of the reflection of the optical probe beam that is incident on the lidar window at a first position on a perimeter of the lidar window, propagates within the window thickness along the first optical path, and exits the window thickness at a second position on the perimeter of the lidar window that is different from the first position.

8. The system of claim 7, wherein intensity of the first portion of the reflection of the optical probe beam is below a detection threshold of the detector.

9. The system of claim 1, wherein the window material comprises a dopant.

10. The system of claim 9, wherein a concentration of the dopant determines the optical absorption coefficient of the window material.

11. A method of reducing of false signals in an optical system, the method comprising:

providing a window material having an optical absorption coefficient;

forming a lidar window having a window thickness using the window material, wherein the lidar window surrounds the optical system such that an optical probe beam is transmitted from an emitter of the optical system to an environment through the lidar window and a first portion of a reflection of the optical probe beam and a second portion of the reflection of the optical probe beam are received by a detector of the optical system from the environment through the lidar window;

attenuating, via a first optical path having a first propagation distance, the first portion of the reflection of the optical probe beam, wherein the first optical path comprises multiple reflections between an inner surface of the lidar window and an outer surface of the lidar window; and attenuating, via a second optical path having a second propagation distance, the second portion of the reflection of the optical probe beam, wherein the second propagation distance is substantially equal to the window thickness, wherein, based at least in part on an optical absorption coefficient of the lidar window, the first portion of the reflection of the optical probe beam is attenuated at least ten times more than the second portion of the reflection of the optical probe beam.

12. The method of claim 11, wherein the lidar window comprises a cylindrical shell, wherein the window thickness is a distance between the inner surface and the outer surface along a direction normal to the inner surface and the outer surface.

13. The method of claim 11, wherein providing the window material further comprises providing the window material having an optical absorption coefficient such that the first portion of the reflection of the optical probe beam is attenuated more than 11 dB along the first propagation distance.

14. The method of claim 11, wherein providing the window material further comprises providing the window material having an optical absorption coefficient such that the second portion of the reflection of the optical probe beam is attenuated less than 1 dB along the second propagation distance.

15. The method of claim 11, wherein a length of the first optical path is equal to an average circumference of the lidar window.

16. The method of claim 11, wherein a length of the first optical path is less than an outer circumference of the lidar window and greater than the window thickness.

17. The method of claim 11, wherein the first portion of a reflection of the optical probe beam comprises a portion of an the reflection of the optical probe beam that is incident on the lidar window at a first position on a perimeter of the lidar window, propagates within the window thickness along the first optical path, and exits the window thickness at a second position on the perimeter of the lidar window that is different from the first position.

18. The method of claim 17, wherein intensity of the first portion of the reflection of the optical probe beam is below a detection threshold of the detector.

19. The method of claim 11, wherein the window material comprises a dopant.

20. The method of claim 19, wherein a concentration of the dopant in the window material determines the optical absorption coefficient of the window material.

* * * * *